United States Patent
Tanaka et al.

(10) Patent No.: US 8,000,391 B2
(45) Date of Patent: Aug. 16, 2011

(54) MOTION VECTOR ESTIMATING METHOD AND MOTION PICTURE PROCESSOR

(75) Inventors: Yasuharu Tanaka, Takatsuki (JP); Shinji Kitamura, Nagaokakyo (JP)

(73) Assignee: Panasonic Corporation, Osaka (JP)

( * ) Notice: Subject to any disclaimer, the term of this patent is extended or adjusted under 35 U.S.C. 154(b) by 1696 days.

(21) Appl. No.: 11/206,947

(22) Filed: Aug. 19, 2005

(65) Prior Publication Data
US 2006/0039474 A1 Feb. 23, 2006

(30) Foreign Application Priority Data

Aug. 19, 2004 (JP) .............................. P.2004-239134
Jun. 13, 2005 (JP) .............................. P.2005-172736

(51) Int. Cl.
*H04N 7/12* (2006.01)
(52) U.S. Cl. ................................................. 375/240.16
(58) Field of Classification Search ............. 375/240.16, 375/240.12, 240.13, 240.18; 382/232, 234, 382/236; *H04N 7/12*
See application file for complete search history.

(56) References Cited

U.S. PATENT DOCUMENTS

| 6,430,317 B1 * | 8/2002 | Krishnamurthy et al. ..... 382/236 |
| 6,434,196 B1 * | 8/2002 | Sethuraman et al. ..... 375/240.12 |
| 6,885,705 B2 * | 4/2005 | Arita et al. ............... 375/240.16 |
| 2002/0015513 A1 | 2/2002 | Ando et al. |
| 2002/0041631 A1 | 4/2002 | Arita et al. |

FOREIGN PATENT DOCUMENTS

| JP | 2000-050278 | 2/2000 |
| JP | 2001-339725 A | 12/2001 |

* cited by examiner

*Primary Examiner* — Tung Vo
(74) *Attorney, Agent, or Firm* — McDermott Will & Emery LLP

(57) ABSTRACT

A motion vector estimator includes an object data input and sorting unit and a reference data input and sorting unit for sorting packed input picture data to separate first picture data used for estimating the motion vector from second picture data that is not used for estimating the motion vector and pack the picture data again respectively, an object data storing unit and a reference data storing unit for storing the repacked first picture data and the second picture data, and a motion vector calculating unit for reading the first picture data from the object data storing unit and the reference data storing unit to perform a calculation for estimating the motion vector.

19 Claims, 35 Drawing Sheets

FIG. 15

| P1-1b | P1-2b | P1-3b | P1-4b |
|---|---|---|---|
| P2-2b | P2-1b | P2-4b | P2-3b |
| P3-1b | P3-2b | P3-3b | P3-4b |
| P4-2b | P4-1b | P4-4b | P4-3b |
| P5-1b | P5-2b | P5-3b | P5-4b |
| P6-2b | P6-1b | P6-4b | P6-3b |
| P7-1b | P7-2b | P7-3b | P7-4b |
| P8-2b | P8-1b | P8-4b | P8-3b |
| P9-1b | P9-2b | P9-3b | P9-4b |
| P10-2b | P10-1b | P10-4b | P10-3b |
| P11-1b | P11-2b | P11-3b | P11-4b |
| P12-2b | P12-1b | P12-4b | P12-3b |
| P13-1b | P13-2b | P13-3b | P13-4b |
| P14-2b | P14-1b | P14-4b | P14-3b |
| P15-1b | P15-2b | P15-3b | P15-4b |
| P16-2b | P16-1b | P16-4b | P16-3b |

FIG. 28

| V450\H451 | 1 | 2 | 3 | 4 |
|---|---|---|---|---|
| ODD | 12 | 12 | 12 | 12 |
| EVEN | 3 | 3 | 3 | 3 |

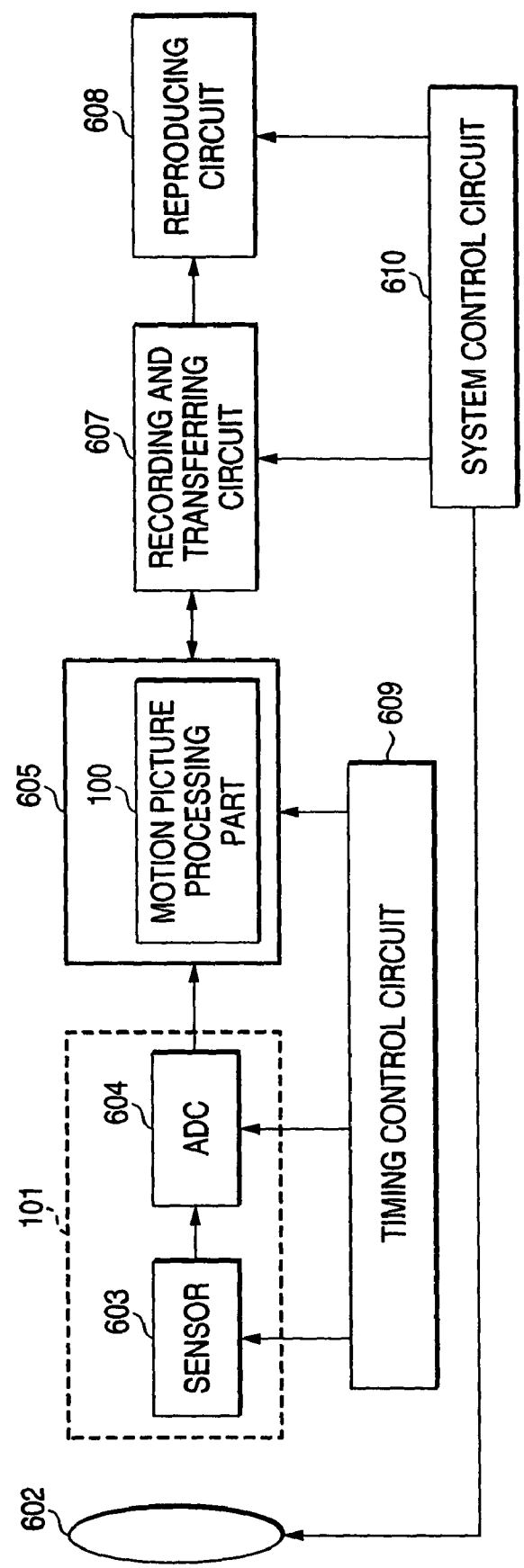

MOTION VECTOR ESTIMATING METHOD AND MOTION PICTURE PROCESSOR

This application is based on Japanese Patent Applications No. 2004-239134 and 2005-172736, which are incorporated herein by reference.

BACKGROUND OF THE INVENTION

1. Field of the Invention

The present invention relates to a motion vector estimating technique for compensation and predictive encoding of a movement in a motion picture compressing and encoding process. More particularly, the present invention relates to a motion vector estimating method and a motion picture processor that applies a sub-sampling method to the input picture data of a picture of an object frame and a picture of a reference frame.

2. Description of the Related Art

In recent years, a motion picture compressing and encoding technique such as an MPEG for performing a highly efficient encoding process has been rapidly progressively put to practical use and spread in video cameras or mobile phones or the like. In the motion picture compressing and encoding technique such as the MPEG, a movement compensating and predicting method has been used in which only the difference data of the displacement of an object to be photographed and a picture is encoded to efficiently compress picture data. In the estimation of a motion vector showing the displacement of the object to be photographed, a block matching method has been widely employed.

FIG. 17 is a diagram for explaining a usual ordinary motion vector estimating method. In FIG. 17, an object block is a block composed of NX×NY pixels as an object to be encoded in a present picture. A reference area is a search area near the same space position as that of the object block in the above-described picture and composed of MX×MY pixels larger than the object block. Further, the reference block is a block composed of NX×NY pixels at an arbitrary position on the reference area.

In the motion vector estimating method by an ordinary block matching method, the object block is compared with the reference block in the reference area to obtain the position of the reference block most matched with the object block and estimate a distance and a direction between the position of the reference block and the position of the object block as a motion vector.

The block matching between the object block and the reference block is performed by obtaining a minimum value of a below-described evaluation function 1 as the sum of the absolute value of the difference of pixel values of the pixels forming the blocks.

Evaluation function 1 $=\Sigma|Ref(Mx+x,My+y)-Org(x,y)|$

Here, Ref (Mx+x, My+y) represents the pixel value in the position (Mx+x, My+y) of the pixels of the reference block located at a relative position (Mx, My) to the object block. Org (x, y) represents the pixel value in the position (x, y) of the pixels of the object block.

Further, when a user desires to estimate a more precise motion vector, a pixel value at an intermediate position between pixel data in the reference area may be obtained by an interpolating process, and this position may be possibly matched with the object block. Further, a plurality of difference accumulators have been hitherto prepared to calculate the evaluation function 1 and allowed to process in parallel to carry out a process at high speed.

JP-A-2001-339725 discloses a technique in which in order to estimate the motion vector at higher speed and reduce consumed electric power, the pixels are sub-sampled so as to have a checkered pattern and calculate an evaluation function in place of calculating the sum of the absolute values of the differences of pixel values for all pixels of the object block and the reference block.

FIG. 18 is a diagram for explaining a state that a sub-sampling process is carried out so as to have a checkered pattern in the object block and the reference block composed of 16×16 pixels to calculate the evaluation function. FIG. 18 shows that, for the pixels in odd number lines, only the data of odd number columns is used, and for the pixels in even number lines, only the data of even number columns is used.

The block matching process of the object block and the reference block according to this system is performed by obtaining the minimum value of a below-described evaluation function 2. In a following formula, a multiplying mark × is omitted. Accordingly, 2x means 2×x.

Evaluation function 2 $=\Sigma|Ref(Mx+2x+1,My+2y+1)-Org(2x+1,2y+1)|+\Sigma|Ref(Mx+2x,My+2y)-Org(2x,2y)|$ In many data processors, when data is transferred and read and written in a storing unit, a method has been ordinarily employed in which P pieces of (P is an arbitrary natural number) picture data are packed to raise processing speed. When the above-described evaluation function is calculated, a method may be considered in which the picture data of the object block and the reference block is packed to carry out a process at high speed.

However, in the technique disclosed in JP-A-2001-339725, below-described problems may be exemplified. For instance, a state is considered that P is equal to 4 and four picture data is packed. This state is explained by referring to FIGS. 11 and 12.

In FIG. 11, D1-1, D1-2 to D16-15 and D16-16 respectively represent one picture data of an object block or a reference block. Here, four picture data of D-11 D1-2, D1-3 and D1-4 are packed to be treated as one packing data P1-1a. As shown similarly in FIG. 12, all picture data are treated as one packing data at intervals of four picture data. It is to be understood that the picture data is transferred or read and written in a storing unit for each packing data unit.

In the technique disclosed in JP-A-2001-339725, since all the picture data are not used for calculating the evaluation function 2, when the picture data is read from the storing unit, unnecessary picture data is read. In the example in which P is equal to 4, the picture data necessary for calculating the evaluation function 2 are merely D1-1 and D1-3 in the packing data P1-1a and D1-2 and D1-4 are not necessary.

When P is equal to 4, four picture data can be treated or processed together. Four difference accumulators can be theoretically prepared for the four picture data at maximum to calculate the evaluation function 2 in four parallel processes. However, as described above, to calculate the evaluation function 2, only two picture data is necessary in the four picture data. Thus, two parallel processes can be merely carried out. Further, since the unnecessary data is read, electric power is wastefully consumed.

SUMMARY OF THE INVENTION

The present invention is proposed to solve the above-described problems and it is an object of the present invention to provide a motion vector estimating method and a motion picture processor in which a calculating process can be carried out at high speed to a parallelism of packing even when packed picture data is used in the estimation of a motion vector by a block matching method using sub-sampled picture data.

A motion vector estimating method according to the present invention applies a sub-sampling method to the packed input picture data of a picture of an object frame and a picture of a reference frame in a motion picture compressing and encoding process. The motion vector estimating method comprises sorting the packed input picture data in accordance with the sub-sampling method to separate first picture data used for estimating a motion vector from second picture data that is not used for estimating the motion vector and pack the picture data respectively again, and estimating the motion vector by using the repacked first picture data.

According to the above-described structure, since the packing data of the object data and the reference data is sorted in accordance with a sub-sampling method and the first picture data used for estimating a motion vector is packed again, a parallel calculation for the number of packs can be achieved and a calculation process speed for estimating the motion vector can be greatly improved.

In the present invention, the motion vector estimating method comprises a step of sorting the packed input picture data in accordance with the sub-sampling method, a step of storing the repacked first picture data and the second picture data in a storing unit, and a step of reading the first picture data stored in the storing unit to perform a calculation for estimating the motion vector.

The motion vector estimating method according to the present invention applies a sub-sampling method to the packed input picture data of a picture of an object frame and a picture of a reference frame in a motion picture compressing and encoding process. The motion vector estimating method comprises sorting the picture data in accordance with the sub-sampling method to separate first picture data used for estimating a motion vector from second picture data that is not used for estimating the motion vector, pack the picture data respectively and use the respectively packed picture data as the input picture data, and performing a calculation for estimating the motion vector by using the first picture data.

According to the above-described structure, since the packing data of the object data and the reference data is sorted in accordance with a sub-sampling method and the first picture data used for estimating a motion vector is packed again, a parallel calculation for the number of packs can be achieved and a calculation process speed for estimating the motion vector can be greatly improved.

In the present invention, the motion vector estimating method comprises a step of sorting the picture data in accordance with the sub-sampling method, inputting the repacked first picture data and the second picture data and storing the picture data in a storing unit, and a step of reading the first picture data stored in the storing unit to perform a calculation for estimating the motion vector.

A motion vector estimating method according to the present invention applies a sub-sampling method to the packed input picture data of a picture of an object frame and a picture of a reference frame in a motion picture compressing and encoding process. In the motion vector estimating method, for the picture of the object frame, the packed input picture data is sorted in accordance with the sub-sampling method to separate first object picture data used for estimating a motion vector from second object picture data that is not used for estimating the motion vector and pack the object picture data respectively again. A calculation is performed for estimating the motion vector by using the repacked first object picture data. Further, for the picture of the reference frame, the picture data is sorted in accordance with the sub-sampling method to separate first reference picture data used for estimating a motion vector from second reference picture data that is not used for estimating the motion vector and pack the reference picture data respectively. The respectively packed reference picture data is used as the input picture data. A calculation is performed for estimating the motion vector by using the first reference picture data.

According to the above-described structure, since the packing data of the object data and the reference data is sorted in accordance with a sub-sampling method and the first picture data used for estimating a motion vector is packed again, a parallel calculation for the number of packs can be achieved and a calculation process speed for estimating the motion vector can be greatly improved.

In the present invention, the motion vector estimating method comprises a step of sorting the packed input picture data of the picture of the object frame in accordance with the sub-sampling method, a step of storing the repacked first object picture data and the second object picture data in a storing unit for object data, a step of sorting the reference picture data in accordance with the sub-sampling method, inputting the repacked first reference picture data and the second reference picture data and storing the reference picture data in a storing unit for reference data, and a step of reading the first object picture data stored in the storing unit for object data and the first reference picture data stored in the storing unit for reference data to perform a calculation for estimating the motion vector.

A motion vector estimating method according to the present invention applies a sub-sampling method to the packed input picture data of a picture of an object frame and a picture of a reference frame in a motion picture compressing and encoding process. In the motion vector estimating method, for the picture of the object frame, the picture data is sorted in accordance with the sub-sampling method to separate first object picture data used for estimating a motion vector from second object picture data that is not used for estimating the motion vector and pack the object picture data respectively. The respectively packed object picture data is used as the input picture data. A calculation is performed for estimating the motion vector by using the first object picture data. Further, for the picture of the reference frame, the packed input picture data is sorted in accordance with the sub-sampling method to separate first reference picture data used for estimating a motion vector from second reference picture data that is not used for estimating the motion vector and pack the reference picture data again respectively. A calculation is performed for estimating the motion vector by using the repacked first picture data.

According to the above-described structure, since the packing data of the object data and the reference data is sorted in accordance with a sub-sampling method and the first picture data used for estimating a motion vector is packed again, a parallel calculation for the number of packs can be achieved and a calculation process speed for estimating the motion vector can be greatly improved.

In the present invention, the motion vector estimating method comprises a step of sorting the object picture data in accordance with the sub-sampling method, inputting the repacked first object picture data and the second object picture data and storing the object picture data in a storing unit for object data, a step of sorting the packed input picture data of the picture of the reference frame in accordance with the sub-sampling method, a step of storing the repacked first reference picture data and the second reference picture data in a storing unit for reference data, and a step of reading the first object picture data stored in the storing unit for object data and the first reference picture data stored in the storing unit for reference data to perform a calculation for estimating the motion vector.

In the present invention, the storing unit includes a plurality of units capable of reading data in parallel so that the picture data having the number of packs can be read together at an arbitrary position of the picture data packed again.

According to the above-described structure, since the repacked picture data can be allocated and stored to the storing unit composed of a plurality of units, even when the positions of the plurality of picture data used for a parallel calculation for estimating the motion vector shift from the packing positions of the picture data, the picture data necessary for the parallel calculation can be read together. Thus, a calculation process speed for estimating the motion vector can be improved at maximum.

In the present invention, the motion vector estimating method further includes a step of reading the first picture data and the second picture data stored in the storing unit and sorting the picture data to restore the input picture data.

In the present invention, the motion vector estimating method further includes a step of storing the packed input picture data in a second storing unit different from the storing unit without sorting the packed input picture data.

According to the above-described structure, to perform a calculation process for estimating the motion vector, the picture data of the storing unit that stores the sorted picture data is used, and when the picture data is outputted, the picture data stored in the second storing unit can be used. Thus, since the sorting process is not necessary upon outputting the picture data, an output process can be performed at high speed.

In the motion vector estimating method according to the present invention, the sub-sampling method selects pixels so as to have a checkered pattern in the picture of the object frame and the picture of the reference frame.

A motion vector estimator according to the present invention applies a sub-sampling method to the packed input picture data of a picture of an object frame and a picture of a reference frame in a motion picture compressing and encoding process. The motion vector estimator comprises an object data input and sorting unit for sorting the packed input picture data of the object frame in accordance with the sub-sampling method to separate first object picture data used for estimating the motion vector from second object picture data that is not used for estimating the motion vector and pack the object picture data again respectively, a reference data input and sorting unit for sorting the packed input picture data of the reference frame in accordance with the sub-sampling method to separate first reference picture data used for estimating the motion vector from second reference picture data that is not used for estimating the motion vector and pack the reference picture data again respectively, an object data storing unit for storing the repacked first object picture data and the second object picture data, a reference data storing unit for storing the repacked first reference picture data and the second reference picture data, and a motion vector calculating unit for reading the first object picture data from the object data storing unit and reading the first reference picture data from the reference data storing unit to perform a calculation for estimating the motion vector.

According to the above-described structure, since the packing data of the object data and the reference data is sorted in accordance with a sub-sampling method and the first picture data used for estimating a motion vector is packed again, a parallel calculation for the number of packs can be achieved and a calculation process speed for estimating the motion vector can be greatly improved.

A motion vector estimator according to the present invention applies a sub-sampling method to the packed input picture data of a picture of an object frame and a picture of a reference frame in a motion picture compressing and encoding process. The motion vector estimator comprises an object data storing unit for sorting the picture data of the object frame in accordance with the sub-sampling method to separate first object picture data used for estimating the motion vector from second object picture data that is not used for estimating the motion vector, pack the object picture data respectively as the input of the object frame and store the packed object picture data, a reference data storing unit for sorting the picture data of the reference frame in accordance with the sub-sampling method to separate first reference picture data used for estimating the motion vector from second reference picture data that is not used for estimating the motion vector, pack the reference picture data respectively as the input of the reference frame and store the packed reference picture data, and a motion vector calculating unit for reading the first object picture data from the object data storing unit and reading the first reference picture data from the reference data storing unit to perform a calculation for estimating the motion vector.

According to the above-described structure, since the packing data of the object data and the reference data is sorted in accordance with a sub-sampling method and the first picture data used for estimating a motion vector is packed again, a parallel calculation for the number of packs can be achieved and a calculation process speed for estimating the motion vector can be greatly improved.

A motion vector estimator according to the present invention applies a sub-sampling method to the packed input picture data of a picture of an object frame and a picture of a reference frame in a motion picture compressing and encoding process. The motion vector estimator comprises an object data input and sorting unit for sorting the packed input picture data of the object frame in accordance with the sub-sampling method to separate first object picture data used for estimating the motion vector from second object picture data that is not used for estimating the motion vector and pack the object picture data again respectively, an object data storing unit for storing the repacked first object picture data and the second object picture data, a reference data storing unit for sorting the picture data of the reference frame in accordance with the sub-sampling method to separate first reference picture data used for estimating the motion vector from second reference picture data that is not used for estimating the motion vector, pack the reference picture data respectively as the input of the reference frame and store the packed reference picture data, and a motion vector calculating unit for reading the first object picture data from the object data storing unit and reading the first reference picture data from the reference data storing unit to perform a calculation for estimating the motion vector.

According to the above-described structure, since the packing data of the object data and the reference data is sorted in accordance with a sub-sampling method and the first picture data used for estimating a motion vector is packed again, a parallel calculation for the number of packs can be achieved and a calculation process speed for estimating the motion vector can be extremely improved.

A motion vector estimator according to the present invention applies a sub-sampling method to the packed input picture data of a picture of an object frame and a picture of a reference frame in a motion picture compressing and encoding process. The motion vector estimator comprises an object data storing unit for sorting the picture data of the object frame in accordance with the sub-sampling method to separate first object picture data used for estimating the motion vector from second object picture data that is not used for estimating the motion vector, pack the object picture data respectively as the input of the object frame and store the packed object picture data, a reference data input and sorting unit for sorting the packed input picture data of the reference frame in accordance with the sub-sampling method to separate first reference picture data used for estimating the motion vector from second reference picture data that is not used for estimating the motion vector and pack the reference picture data respectively, a reference data storing unit for storing the repacked first reference picture data and the second reference picture data, and a motion vector calculating unit for reading the first object picture data from the object data storing unit and reading the first reference picture data from the reference data storing unit to perform a calculation for estimating the motion vector.

According to the above-described structure, since the packing data of the object data and the reference data is sorted in accordance with a sub-sampling method and the first picture data used for estimating a motion vector is packed again, a parallel calculation for the number of packs can be achieved and a calculation process speed for estimating the motion vector can be extremely improved.

In the present invention, the object data storing unit and the reference data storing unit are composed of a plurality of units capable of reading data in parallel so that the picture data having the number of packs can be read together at an arbitrary position of the picture data packed again.

According to the above-described structure, since the repacked picture data can be allocated and stored to the object data storing unit and the reference data storing unit composed of a plurality of units, even when the positions of the plurality of picture data used for a parallel calculation for estimating the motion vector shift from the packing positions of the picture data, the picture data necessary for the parallel calculation can be read together. Thus, a calculation process speed for estimating the motion vector can be improved at maximum.

According to the present invention, in the object data storing unit and the reference data storing unit composed of a plurality of units, the object data storing unit and the reference data storing unit that do not write or read data are controlled to stop the supply of an operating clock.

According to the above-described structure, since the operating clock can be stopped for the object data storing unit and the reference data storing unit that do not write or read the data, wasteful consumed electric power can be reduced.

In the present invention, a motion picture processor includes an object data output and sorting unit for reading and sorting the first object picture data and the second object picture data stored in the object data storing unit to restore the input picture data of the object frame, and a reference data output and sorting unit for reading and sorting the first reference picture data and the second reference picture data stored in the reference data storing unit to restore the input picture data of the reference frame.

In the present invention, a second object data storing unit and a second reference data storing unit different from the object data storing unit and the reference data storing unit are included to store the packed input picture data of the picture of the object frame and the picture of the reference frame in the second object data storing unit and the second reference data storing unit without performing a sorting process.

According to the above-described structure, to perform a calculation process for estimating the motion vector, the picture data of the object data storing unit and the reference data storing unit that store the sorted picture data is used, and when the picture data is outputted, the picture data stored in the second object data storing unit and the second reference data storing unit can be used. Thus, since the sorting process is not necessary upon outputting the picture data, an output process can be performed at high speed.

In the present invention, the sub-sampling method selects pixels so as to have a checkered pattern in the picture of the object frame and the picture of the reference frame.

A picture pick-up system according to the present invention comprises a picture processor including a signal processor described in any one of claims of the motion vector estimator according to the present invention to perform a picture process, a sensor for outputting a picture signal to the picture processor, and an optical system for connecting light to the sensor.

According to the above-described structure, a high speed picture process can be anticipated by sorting data at high speed.

The picture pick-up system of the present invention further includes a converter for converting the picture signal obtained from the sensor to a digital signal and supplying the digital signal to the picture processor.

According to the above-described structure, an advantage of a digital signal process can be exhibited.

According to the present invention, since the packing data of the object data and the reference data is sorted in accordance with a sub-sampling method and picture data used for estimating a motion vector is packed again, a parallel calculation for the number of packs can be achieved and a calculation process speed for estimating the motion vector can be greatly improved.

BRIEF DESCRIPTION OF THE DRAWINGS

FIG. 15 is a diagram showing the state of the sorted packing data in the sub-sampling process of a checkered pattern;

FIG. 28 is a diagram showing the contents of an input data enable signal forming table corresponding to the sub-sampling process shown in FIG. 21;

FIG. 35 is a diagram showing a picture pick-up system according to a fifth embodiment of the present invention.

DETAILED DESCRIPTION OF THE PREFERRED EMBODIMENTS

Figure 19:
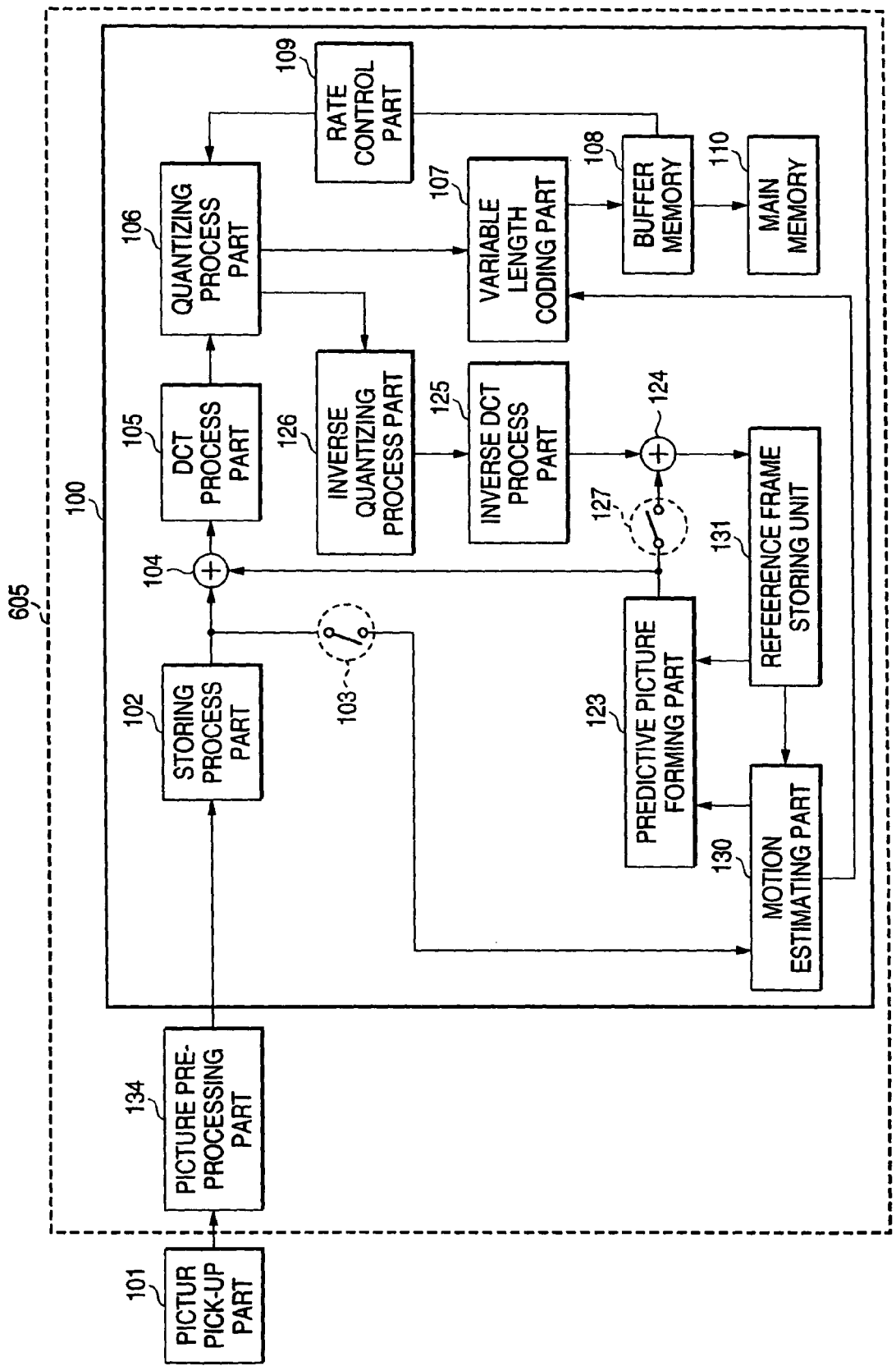
FIG. 19 is a block diagram showing a structural example of a representative motion picture shooting device of an MPEG system.

FIG. 19 is a block diagram showing a structural example of a representative picture processor of an MPEG system. In FIG. 19, the picture processor 605 includes a picture pre-processing part 134 and a motion picture processing part 100 to process a picture relative to a picture frame signal sent from a picture pick-up part 101.

The picture pre-processing part 134 receives the frame picture signal of m pixels×n lines (m and n are natural numbers) sent from the picture pick-up part 101 to perform a YC process, an edge process and an enlarging and reducing process of a picture relative to the frame picture signal and supplies a formed frame picture composed of a luminance signal Y and color difference signals Cr and Cb of i pixels×j lines (i and j are natural numbers) to the motion picture processing part 100.

The motion picture processing part 100 includes the picture pick-up part 101, a sorting process part 102, a switch 103, a subtraction process part 104, a DCT process part 105, a quantizing process part 106, a variable-length encoding part 107, a buffer memory 108, a rate control part 109, a main memory 110, a predictive picture forming part 123, an addition process part 124, an inverse DCT process part 125, an inverse quantizing process part 126, a switch 127, a motion estimating part 130 and a reference frame storing unit 131.

Now, as an example, a case is considered in which a motion picture having 128 pixels×128 lines is compressed and encoded. The picture pick-up part 101 forms the frame picture signal of m pixels×n lines every prescribed time and supplies the frame picture signal to the picture pre-processing part 134. The picture pre-processing part 134 performs the YC process, the edge process and the enlarging and reducing process of a picture to the supplied frame picture signal to form the frame picture composed of the luminance signal Y and the color difference signals Cr and Cb having 128 pixels×128 lines, and outputs the formed frame picture to the sorting process part 102.

The sorting process part 102 receives the frame picture from the picture pre-processing part 134 and outputs the frame picture to the subtraction process part 104. The sorting process part further determines the received frame picture to be either an I-picture (Intra picture) encoded in a frame, or a P-picture (Predictive picture) or a B-picture (Bi-directional predictive picture) encoded between frames, and then outputs the P-picture and the B-picture to the motion estimating part 130.

Figure 20:
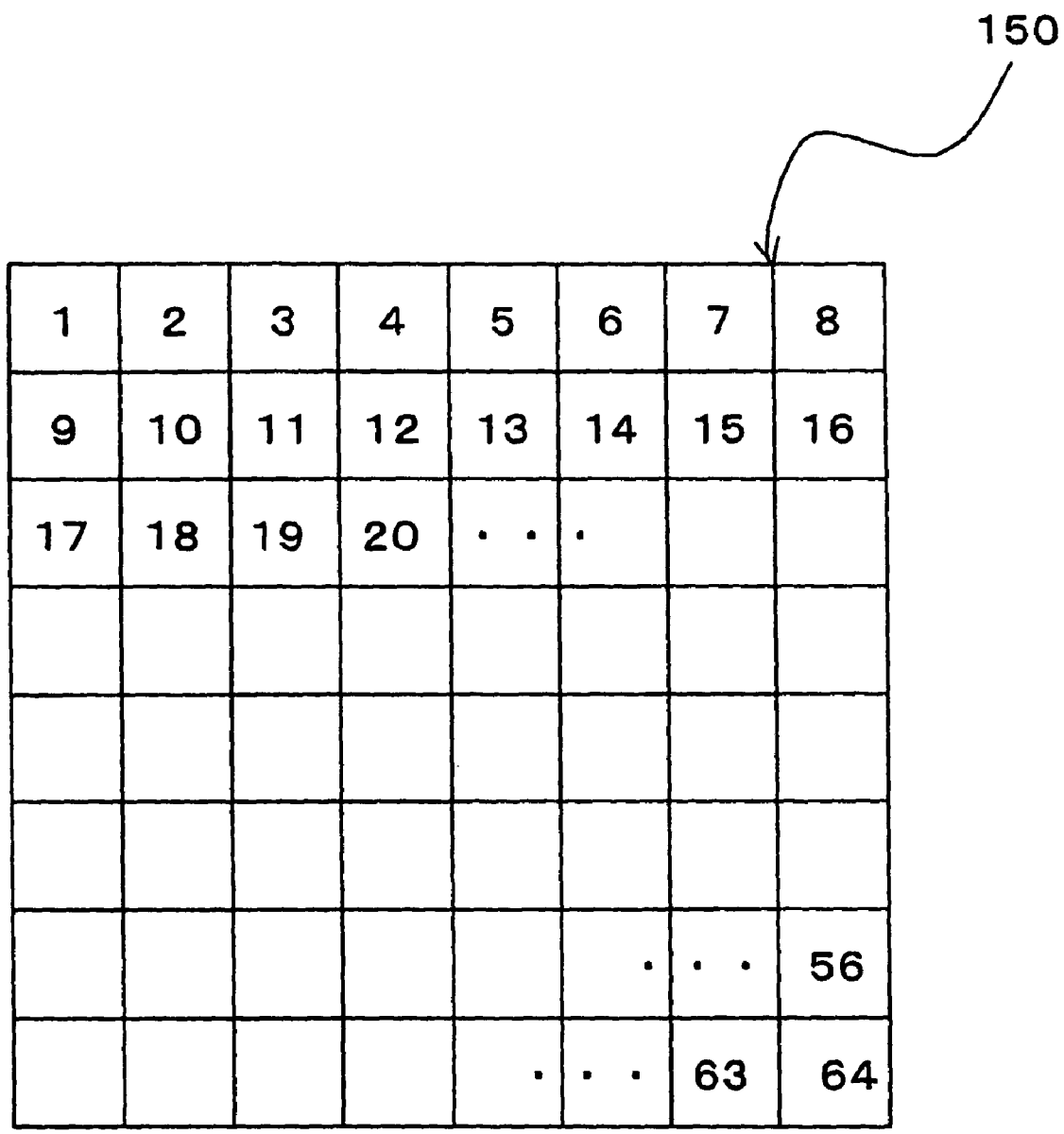
FIG. 20 is a diagram for explaining the structure of a frame picture.

All frame pictures treated in the sorting process part 102 includes 64 object blocks formed by equally dividing lengthwise the frame picture 150 into eight parts and equally dividing breadth-wise the frame picture 150 into eight parts, as shown in FIG. 20. Each of the object blocks is composed of pixel data of 16 pixels×16 lines. Block numbers of 1 to 64 are respectively allocated to the object blocks so that 1 to 8 are allocated in regular order from a left side to the eight object blocks located in a first line and 9 to 16 are allocated in regular order from a left side to the eight object blocks located in a second line. The block number shows the position of each object block in the frame picture and the order of an encoding process.

Further, when the sorting process part 102 outputs the object block having the block number 1 of the object blocks of the P-picture or the B-picture, the sorting process part 102 outputs a control signal showing a start of one frame picture to the motion estimating part 130.

The frame picture is processed for each object block in the sorting process part 102, the subtraction process part 104, the DCT process part 105, the quantizing process part 106, the variable-length encoding part 107, the predictive picture forming part 123, the addition process part 124, the inverse DCT process part 125, the inverse quantizing process part 126, the motion estimating part 130 and the reference frame storing unit 131.

The subtraction process part 104 receives the object block of the I-picture from the sorting process part 102 and directly outputs the received object block of the I-picture to the DCT process part 105. Further, the subtraction process part 104 receives the object block of the P-picture or the B-picture from the sorting process part 102, receives the predictive picture of the objet block of the P-picture or the B-picture from the predictive picture forming part 123 and subtracts the predictive picture received from the predictive picture forming part 123 from the object block received from the sorting process part 102 to form difference data. The subtraction process part 104 outputs the formed difference data of the object block of the P-picture or the B-picture to the DCT process part 105.

The DCT process part 105 applies a process of DCT to the object block of the I-picture or the difference data of the object block of the P-picture or the B-picture received from the subtraction process part 104 to form a DCT coefficient and outputs the formed DCT coefficient to the quantizing process part 106.

The quantizing process part 106 applies a quantizing process to the DCT coefficient received from the DCT process part 105 to form a quantized DCT coefficient and outputs the quantized DCT coefficient to the variable-length encoding part 107. Further, the quantized DCT coefficients of the I-picture and the P-picture are also outputted to the inverse quantizing process part 126.

The variable-length encoding part 107 receives the quantized DCT coefficient from the quantizing process part 106 and receives the motion vector of the object block of the P-picture or the B-picture from the motion estimating part 130 to form a prescribed variable-length code of an encoding system and outputs the variable-length code to the buffer memory 108.

The buffer memory 108 receives the variable-length code from the variable-length encoding part 107 to store the variable-length code. The rate control part 109 monitors a quantity of bits of the variable-length code supplied to the buffer memory 108 to optimize a quantizing scale of the quantizing process part 106.

The main memory 110 receives the variable-length code from the buffer memory 108 to store the variable-length code. The variable-length code stored in the main memory 110 is outputted to an external storage device such as a CD-R, a memory card, etc.

The inverse quantizing process part 126 applies an inverse quantizing process to the quantized DCT coefficient received from the quantizing process part 106 to form a DCT coefficient and outputs the DCT coefficient to the inverse DCT process part 125. The inverse DCT process part 125 applies an inverse DCT process to the DCT coefficient received from the inverse quantizing process part 126 to form the data of the object block of the I-picture or the difference data of the object block of the P picture and outputs the data to the addition process part 124.

The addition process part 124 receives the data of the object block of the I-picture or the difference data of the object block of the P-picture from the inverse DCT process part and receives the predictive picture of the object block of the P-picture from the predictive picture forming part 123. In the case of the I-picture, the object block is directly outputted to the reference frame storing unit 131.

In the case of the P-picture, the difference data and the predictive picture of the object blocks are added to form the data of the object blocks and the data is outputted to the reference frame storing unit 131. The reference frame storing unit 131 stores the object blocks of the I-picture and the P-picture received from the addition process part 124.

The motion estimating part 130 estimates the motion vector of the object block of the P-picture or the B-picture received from the sorting process part 102 on the basis of the object block of the I-picture or the P-picture stored in the reference frame storing unit 131, and outputs the estimated motion vector to the variable-length encoding part 107 and the predictive picture forming part 123. The operation of the motion estimating part 130 will be respectively described in detail in embodiments.

The predictive picture forming part 123 forms the predictive picture of the object block of the P-picture or the B-picture by using the motion vector received from the motion estimating part 130 on the basis of the object block of the I-picture or the P-picture stored in the reference frame storing unit 131. In the case of the P-picture, the formed predictive picture is outputted to the subtraction process part 104 and the addition process part 124. In the case of the B-picture, the formed predictive picture is outputted to the subtraction process part 104.

The reference frame storing unit 131 is composed of a RAM and stores the frame pictures of the I-picture and the P-picture based on which the motion vector is estimated and the predictive picture is formed in a movement compensating and predictive encoding process. The I-picture and the P-picture stored in the reference frame storing unit 131 are referred to as reference frames. The object block forming the reference frame is referred to as a reference block. Here, in the object block and the reference block, while P pieces of picture data are respectively packed, the picture data is transferred or read and written in a memory or a storing unit or the like.

First Embodiment

Figure 2:
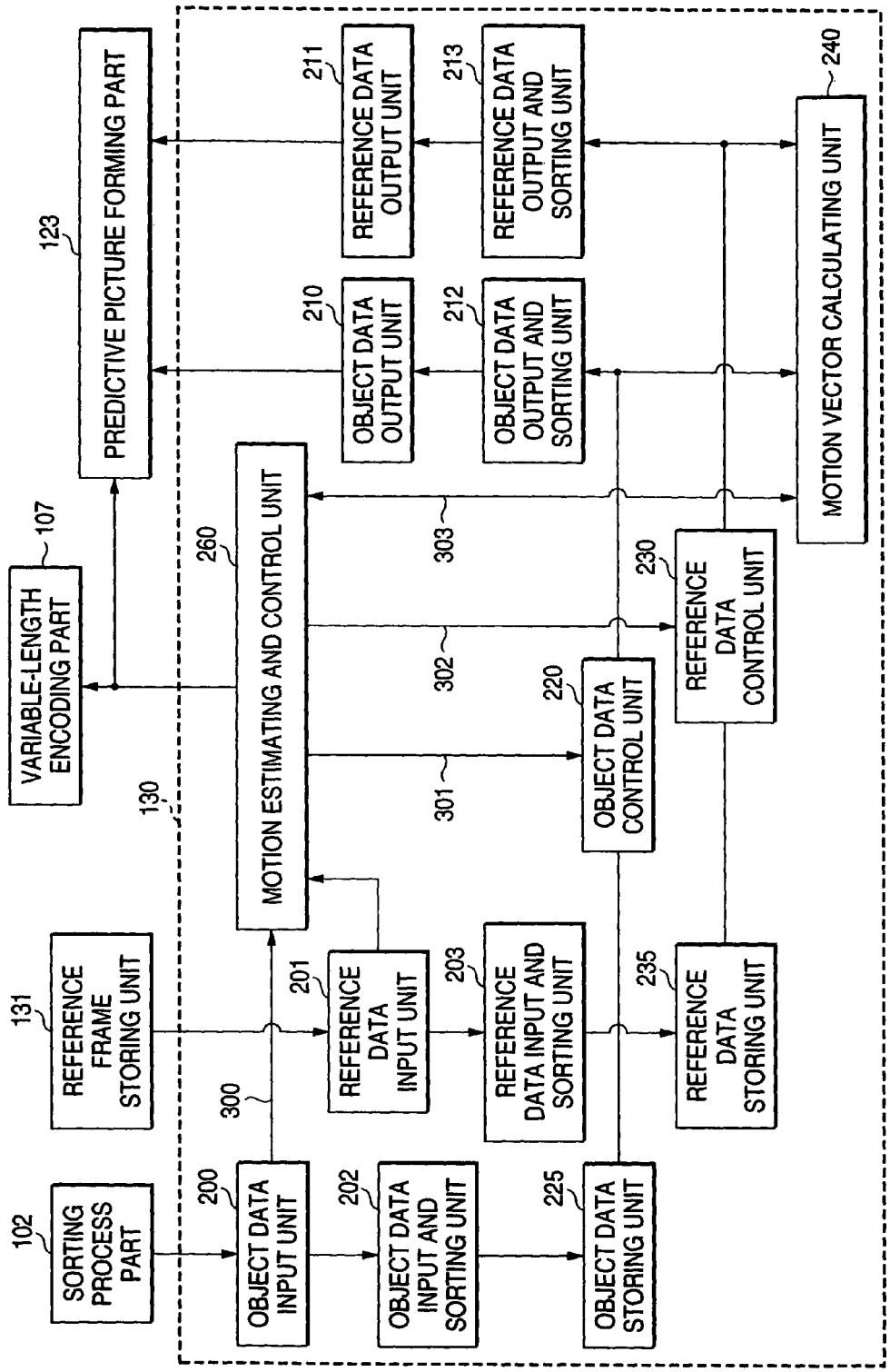
FIG. 2 is a block diagram showing the structure of the motion vector estimator according to the first embodiment of the present invention.

FIG. 2 is a block diagram showing the structure of a motion vector estimator according to a first embodiment of the present invention and shows a specific structural example of the motion estimating part 130 shown in FIG. 19.

In FIG. 2, the motion estimating part 130 includes a motion estimating and control unit 260, a motion vector calculating unit 240, an object data control unit 220, an object data input unit 200, an object data input and sorting unit 202, an object data storing unit 225, an object data output and sorting unit 212, an object data output unit 210, a reference data control unit 230, a reference data input unit 201, a reference data input and sorting unit 203, a reference data storing unit 235, a referenced at a output and sorting unit 213 and a reference data output unit 211.

The motion estimating and control unit 260 controls the entire part of the motion estimating part 130. The object data control unit 220 performs a control for reading object data from the object data storing unit 225 when the motion vector is estimated, and performs a control for reading the picture data when the picture data is transferred to the predictive picture forming part 123 after the motion vector is estimated.

Similarly, the reference data control unit 230 performs a control for reading reference data from the reference data storing unit 235 when the motion vector is estimated, and performs a control for reading the picture data when the picture data is transferred to the predictive picture forming part 123 after the motion vector is estimated.

The object data input unit 200 receives from the sorting process part 102 the object block of the I-picture, the P-picture or the B-picture as an object in which the motion vector is estimated, transfers the received object block to the object data input and sorting unit 202 and supplies a control signal 300 showing the receipt of the object block to the motion estimating and control unit 260.

The object data input and sorting unit 202 sorts the P pieces of packed object blocks that are transferred from the object data input unit 200 so that only the picture data used when the motion vector is estimated can be read from the object data storing unit 225, and transfers the sorted data to the object data storing unit 225.

Figure 11:
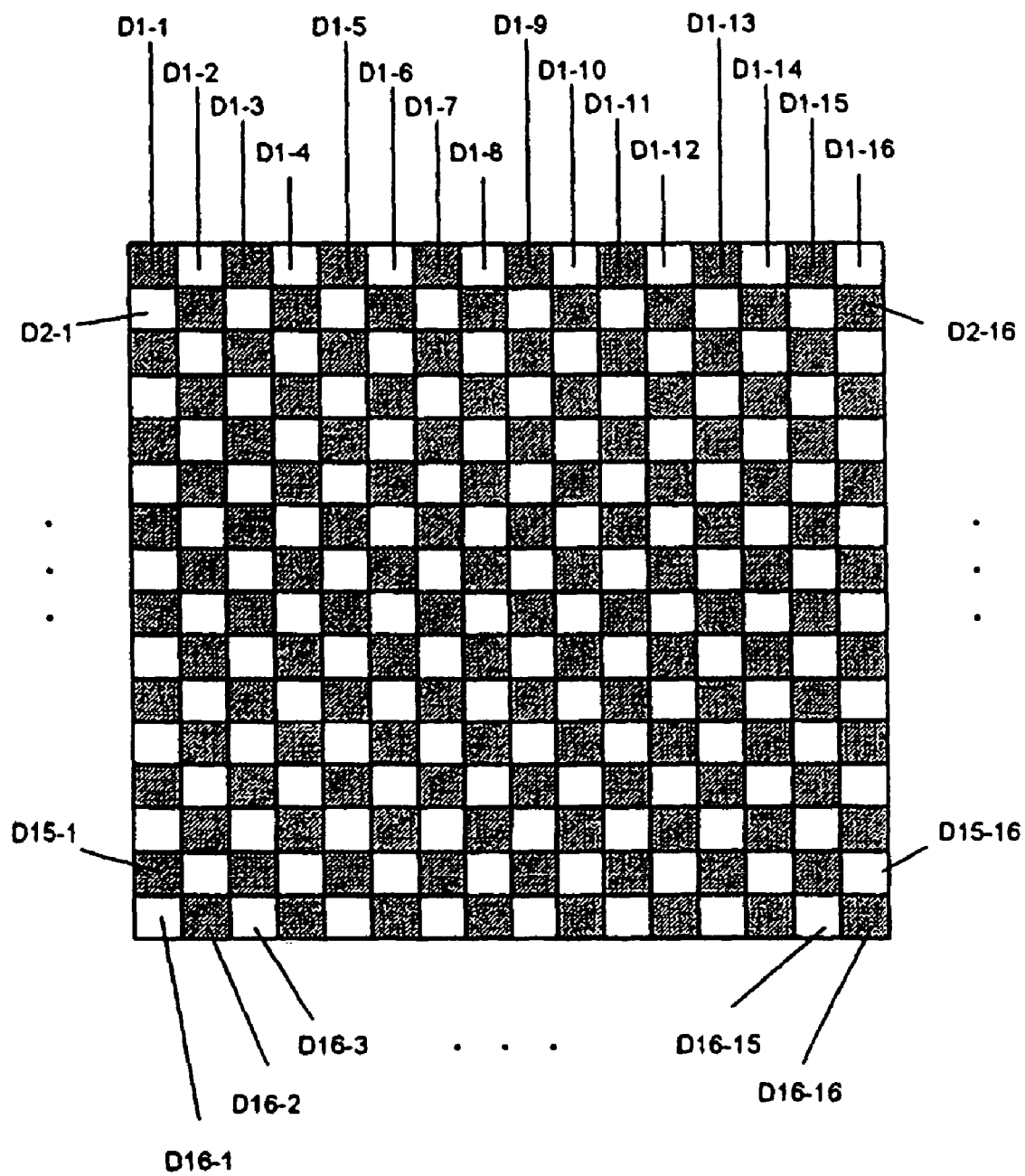
FIG. 11 is a diagram showing a state of picture data in a sub-sampling of a checkered pattern.
Figure 12:
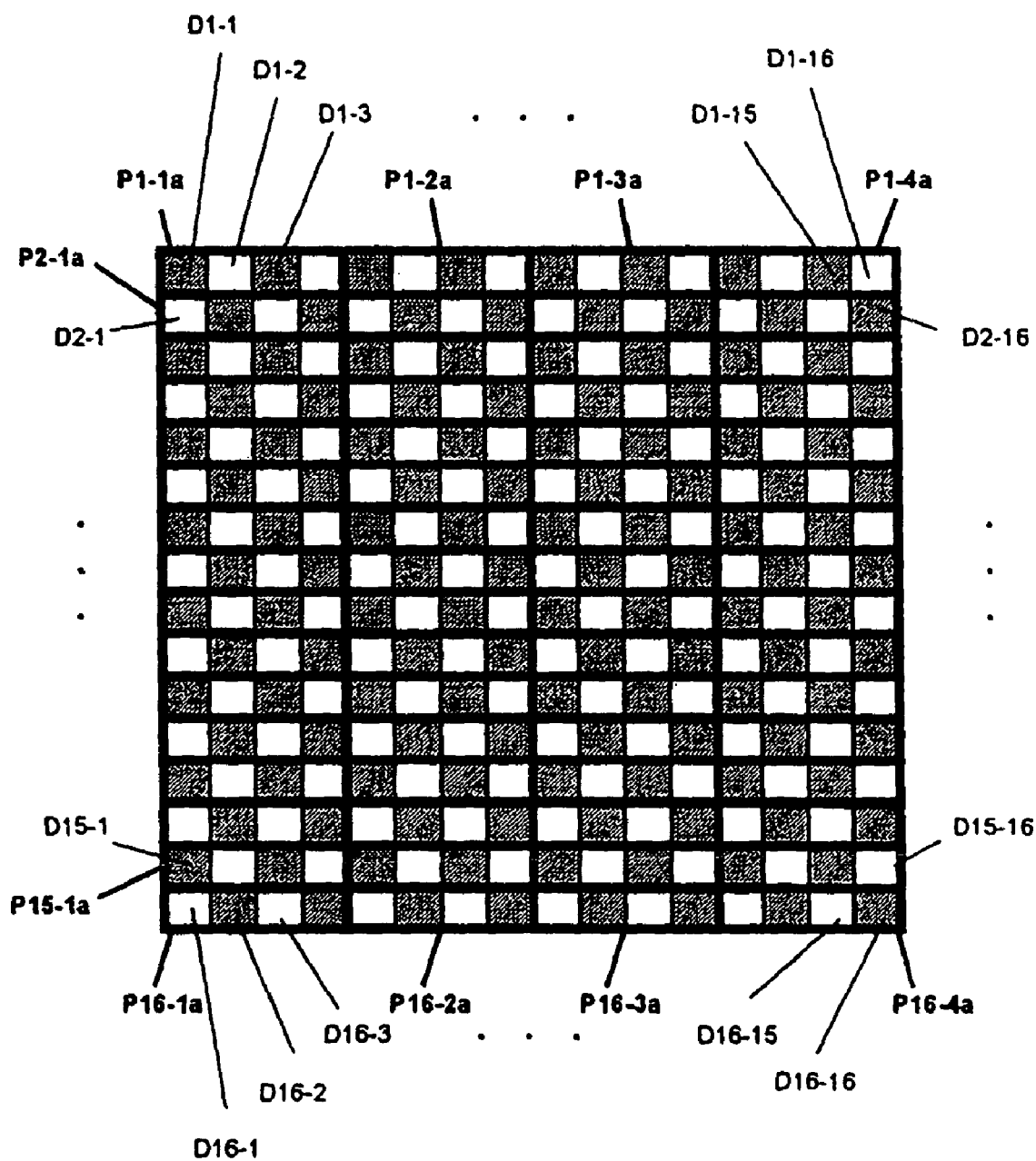
FIG. 12 is a diagram showing a state of packing data in the sub-sampling of a checkered pattern.

Now, an operation of the object data input and sorting unit 202 will be described in detail by referring to FIGS. 11 to 14. When P is equal to 4, the picture data of D1-1 to D16-16 in FIG. 11 is packed at intervals of four picture data as shown in FIG. 12. The packed picture data is treated as one packing data. That is, the picture data of D1-1, D1-2, D1-3 and D1-4 is treated as the packing data P1-1$a$. The picture data of D1-5, D1-6, D1-7 and D1-8 is treated as the packing data P1-2$a$. The picture data of D16-13, D16-14, D16-15 and D16-16 is treated as the packing data P16-4$a$.

The picture data necessary for estimating the motion vector includes only D1-1 and D1-3 in P1-1$a$ and only D1-5 and D1-7 in P1-2$a$. Thus, the picture data are sorted so as to obtain a pack in which the picture data necessary for estimating the motion vector are selected within the packing data of P1-1$a$ and P1-2$a$.

Figure 13:
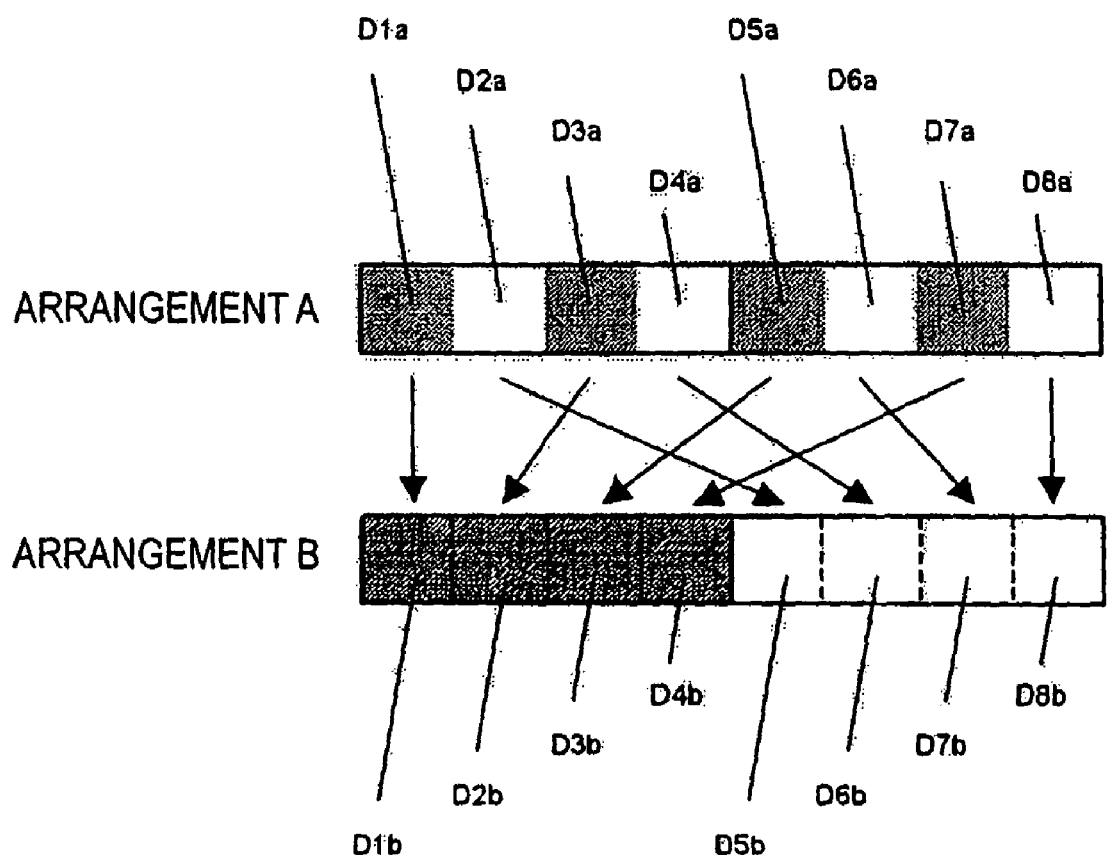
FIG. 13 is a diagram for explaining the sorting process of the packing data in the sub-sampling process of a checkered pattern.

FIG. 13 is a diagram for explaining the sorting operation. In the sorting operation of P1-1$a$ and P1-2$a$, D1$a$ to D8$a$ respectively represent D1-1 to D1-8. The sorting operation indicates that D1$a$ is sorted to D1$b$, D2$a$ is sorted to D5$b$, D3$a$ is sorted to D2$b$, D4$a$ is sorted to D6$b$, D5$a$ is sorted to D3$b$, D6$a$ is sorted to D7$b$, D7$a$ is sorted to D4$b$ and D8$a$ is sorted to D8$b$. In such a way, after the picture data is sorted, the picture data of D1$b$ to D4$b$ is packed again as P1-1$b$ and the picture data of D5$b$ to D8$b$ is packed again as P1-2$b$ and the obtained picture data is transferred to the object data storing unit 225.

Figure 14:
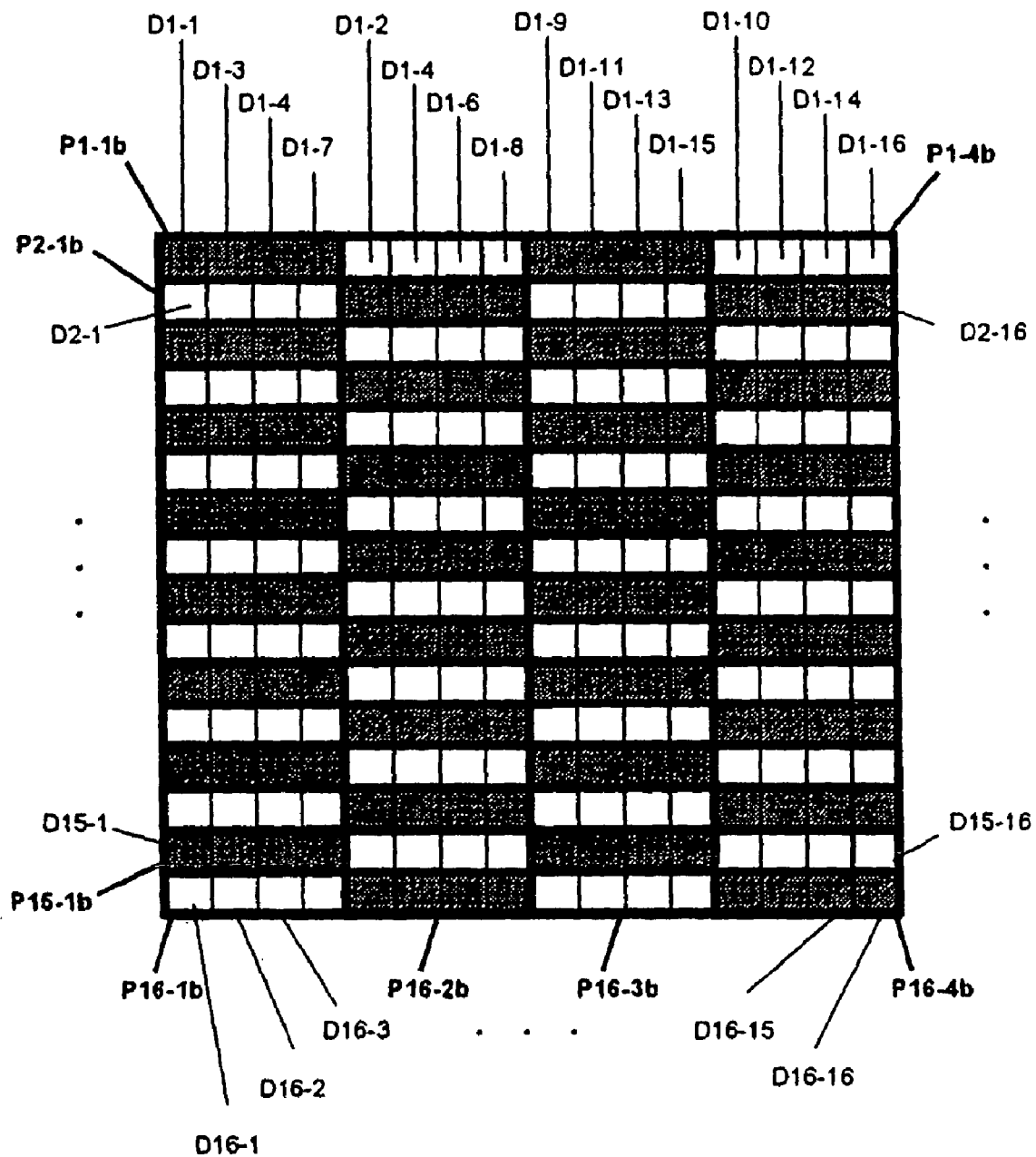
FIG. 14 is a diagram showing the state of the sorted packing data in the sub-sampling process of a checkered pattern.

A state in which the same sorting operation is performed from P1-3$a$ and P1-4$a$ to P16-3$a$ and P16-4$a$ and the picture data is packed again is shown in FIG. 14. The arrangement of the picture data of P1-1$a$ to P16-4$a$ shown in FIG. 12 is referred to as an arrangement A, and the arrangement of the picture data of P1-1$b$ to P16-4$b$ is referred to as an arrangement B. Namely, the object data input and sorting unit 202 is a sorting process unit from the arrangement A to the arrangement B.

The reference data input unit 201 receives the reference block from the reference frame storing unit 131, transfers the received reference block to the reference data input and sorting unit 203 and transmits a control signal showing the receipt of the reference block to the motion estimating and control unit 260.

The reference data input and sorting unit 203 sorts the arrangement of the picture data to an arrangement B from an arrangement A relative to all the picture data like the object data input and sorting unit 202, so that only the picture data used for estimating the motion vector can be read from the reference data storing unit 235, and transfers the sorted data to the reference data storing unit 235.

Figure 3:
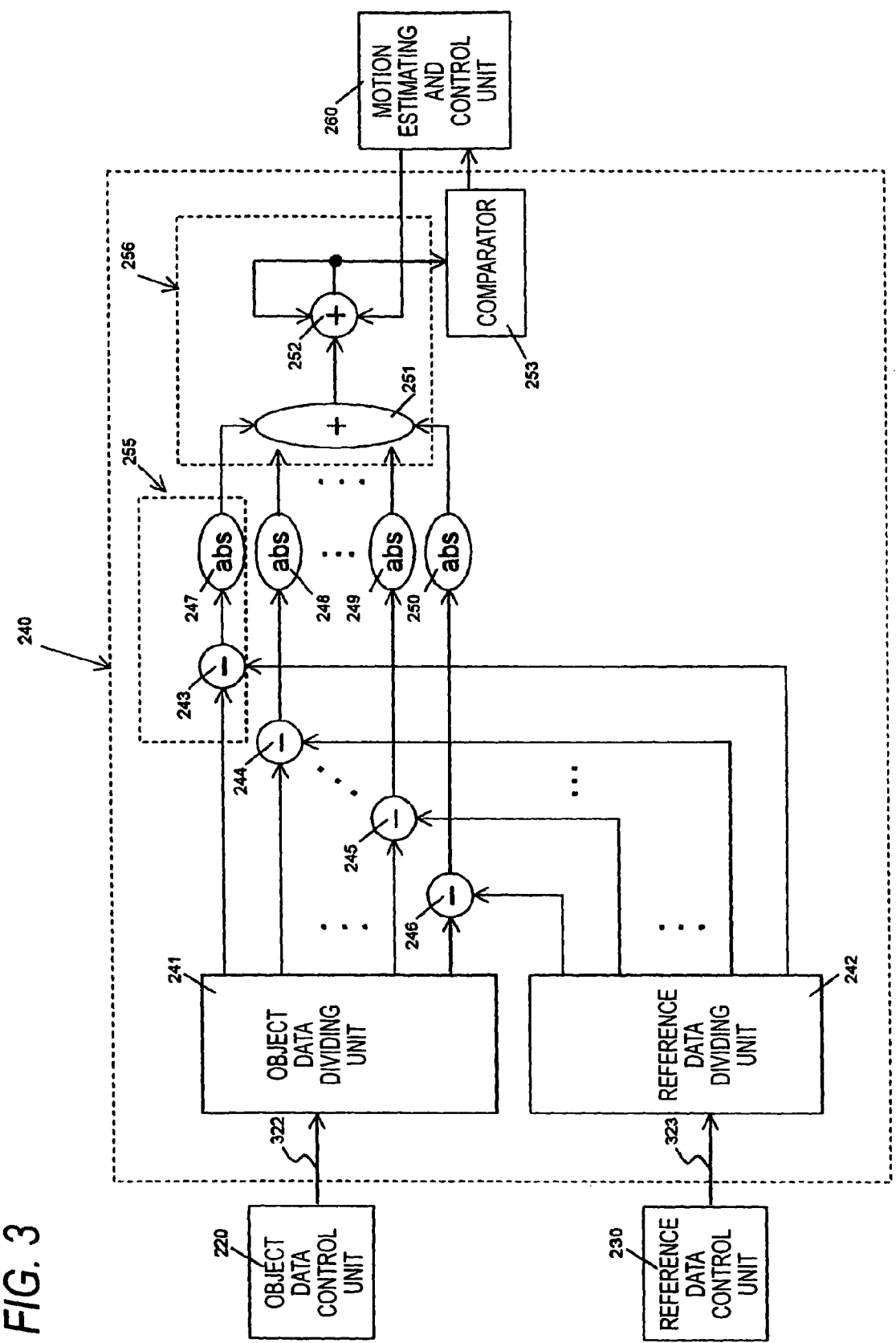
FIG. 3 is a block diagram showing a structural example of a motion vector calculating unit.

The motion vector calculating unit 240 uses the picture data read from the object data storing unit 225 and the reference data storing unit 235 to estimate the motion vector. FIG. 3 is a block diagram showing the structural example of the motion vector calculating unit 240. In FIG. 3, the motion vector calculating unit 240 includes an object data dividing unit 241, a reference data dividing unit 242, M difference devices 243 to 246, absolute value calculating devices 247 to 250 having the same number as that of the difference devices, a multi-input adder 251, an accumulator 252 and a comparator 253.

One difference device and the absolute value calculating device connected to the difference device are called a difference unit 255 as one set. Thus, in the drawing, there are M difference units. Further, the multi-input adder 251 and the accumulator 252 are called as an accumulating unit 256 as one set.

When the object data control unit 220 receives an instruction from the motion estimating and control unit 260, the object data control unit 220 reads the object block from the object data storing unit 225 to supply the object block to the motion vector calculating unit 240. The reference data control unit 230 reads the reference block from the reference data storing unit 235 to supply the reference block to the motion vector calculating unit 240.

The picture data of the object block and the reference block respectively supplied to the motion vector calculating unit is the packing data. Accordingly, the picture data is divided for each picture data in the object data dividing unit 241 and the reference data dividing unit 242 and the picture data is supplied to the next difference devices 243 to 246.

The difference devices 243 to 246 respectively calculate difference values for the picture data and respectively supplies the difference values to the absolute value calculating devices 247 to 250. The absolute value calculating devices 247 to 250 calculate absolute values to the difference values.

Further, the calculated results outputted from the M absolute value calculating devices are supplied to the adder 251 as the multi-input adder and all the data are added and the obtained data is sent to the accumulator 252. The accumulator 252 can perform a reset process at any time in which a reset signal is generated by the motion estimating and control unit 260 to set an accumulated value to 0.

When the differences of all the picture data are completely accumulated, the accumulated result of the accumulator 252 is sent to the comparator 253 and compared with the accumulated result that is previously sent and held. Then, a smaller accumulated value is selected to hold an optimum motion vector in the comparator 253. When a prescribed number of times of the estimation of the motion vector are completed, an optimum motion vector obtained among them is outputted to the motion estimating and control unit 260. Further, the estimated motion vector is transferred to the variable-length encoding part 107 and the predictive picture forming part 123.

After the motion vector is estimated, object data is read from the object data storing unit 225 by the object data control unit 220. The picture data is sorted from the arrangement B to the arrangement A by the object data output and sorting unit 212 and the result is transferred to the predictive picture forming part 123 by the object data output unit 210.

Similarly, reference data is read from the reference data storing unit 235 by the reference data control unit 230. The picture data is sorted from the arrangement B to the arrangement A by the reference data output and sorting unit 213 and the result is transferred to the predictive picture forming part 123 by the reference data output unit 211.

Figure 1:
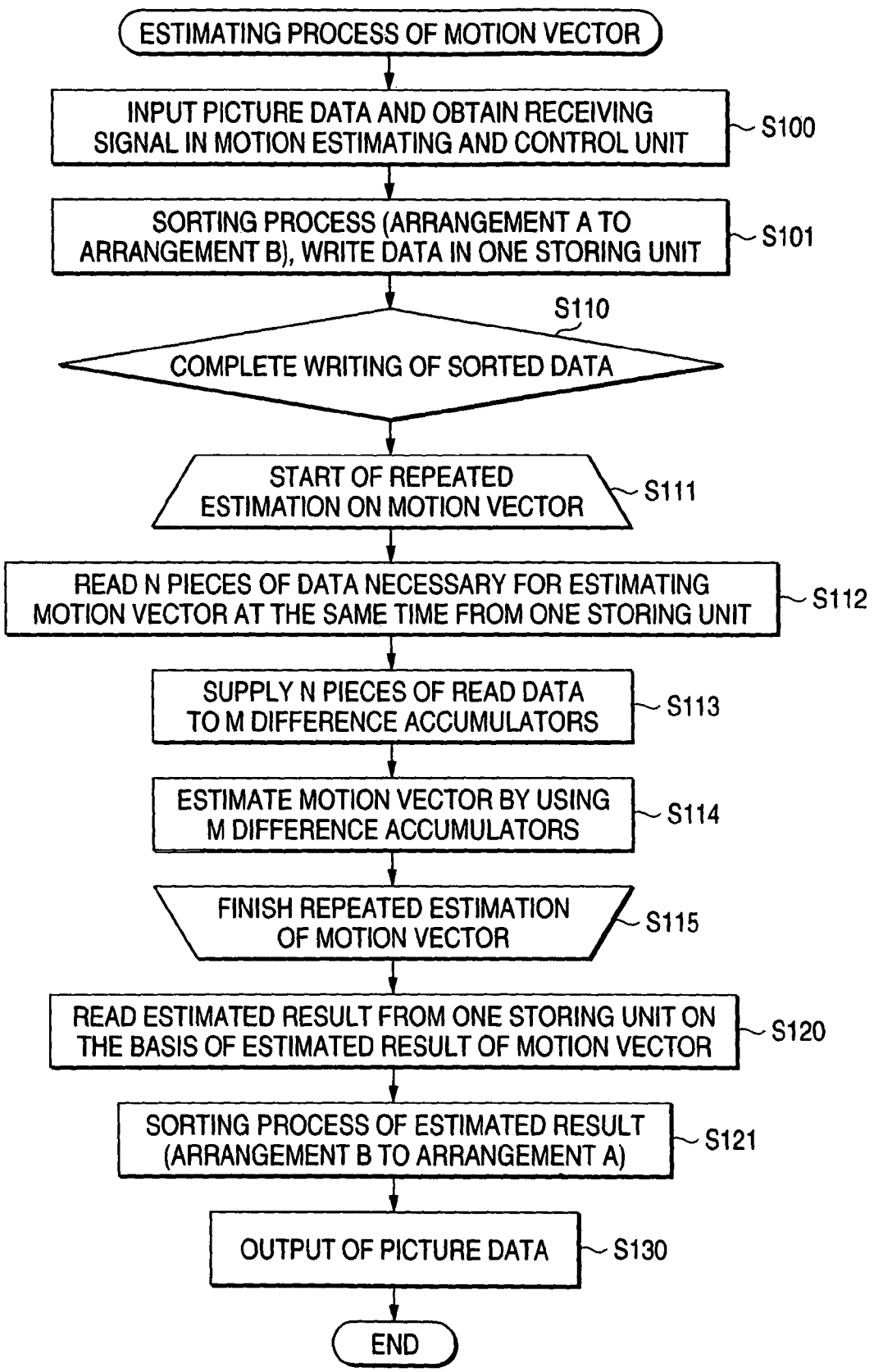
FIG. 1 is a flowchart for explaining the processes of a motion vector estimator according to a first embodiment of the present invention.

FIG. 1 is a flowchart in which the above-described contents are sorted in a motion vector estimating process of one frame in the motion estimating part 130. Now, referring to FIG. 2, the processes of the flowchart will be described below.

(Step S100) The object block is inputted to the object data input unit 200 and the reference block is inputted to the reference data input unit 201 and the outputs thereof are respectively supplied to the object data input and sorting unit 202 and the reference data input and sorting unit 203. At this time, the object data input unit 200 and the reference data input unit 201 send a receiving signal 300 to the motion estimating and control unit 260.

(Step S101) The object data input and sorting unit 202 and the reference data input and sorting unit 203 respectively sort the object data and the reference data from the arrangement A to the arrangement B. Outputs thereof are respectively written in the object data storing unit 225 and the reference data storing unit 235.

(Step S110) The process is waited for until the object data is completely written in the object data storing unit and the reference data is completely written in the reference data storing unit. The completion of writing of the data is recognized by the receiving signal 300 transmitted to the motion estimating and control unit by the object data input unit 200 and the reference data input unit 201, respectively.

(Step S112) When the motion estimating and control unit 260 recognizes that all the data is complete written the motion estimating and control unit 260 transmits a reading instruction 301 of the object data from the object data storing unit 225 to the object data control unit 220, and transmits a reading instruction 302 of the reference data from the reference data storing unit 235 to the reference data control unit 230. At this time, only data necessary for estimating the movement can be read due to the sort of the picture data carried out in the step S101.

(Steps S113 and S114) The motion vector calculating unit 240 is associated with the motion estimating and control unit 260 by a control signal 303. When the object data and the reference data read from the object data storing unit 225 and the reference data storing unit 235 are supplied to the motion vector calculating unit 240, the motion vector calculating unit 240 calculates the evaluation function by using the M difference accumulators to estimate the motion vector.

(Steps S115 and S111) A reading start position (Mx, My in FIG. 17) of the reference data is changed to repeat the above-described steps S112 to S114 prescribed number of times. Every time of the operations, the evaluation function is calculated and compared. Then, an optimum motion vector obtained when a repetition is completed, is transferred to the motion estimating and control unit 260. Further, the estimated motion vector is transferred to the variable-length encoding part 107 and the predictive picture forming part 123.

(Step S120) When the estimation of the motion vector is completed, the motion estimating and control unit 260 instructs the object data control unit 220 to read the object data from the object data storing unit 225. Further, the motion estimating and control unit 260 instructs the reference data control unit 230 to read the reference data adapted to the estimated motion vector from the reference data storing unit 235 on the basis of information obtained from the motion vector calculating unit 240.

(Steps S121 and S130) The arrangement of the picture data of the read object data is returned to the arrangement A from the arrangement B by the object data output and sorting unit 212. The arrangement of the picture data of the read reference data is returned to the arrangement A from the arrangement B by the reference data output and sorting unit 213. The sorted picture data is outputted to the predicted picture forming part 123.

As described above, since the motion vector estimator of this embodiment is used to sort the packing data of the object data and the reference data, a calculating process speed for estimating the motion vector can be greatly improved.

Further, in this embodiment, the picture data can be sorted by the object data input and sorting unit 202 and the reference data input and sorting unit 203 as shown in FIG. 15. Thus, a displacement for each line in the picture data shown in FIG. 14 can be absorbed.

Figure 4:
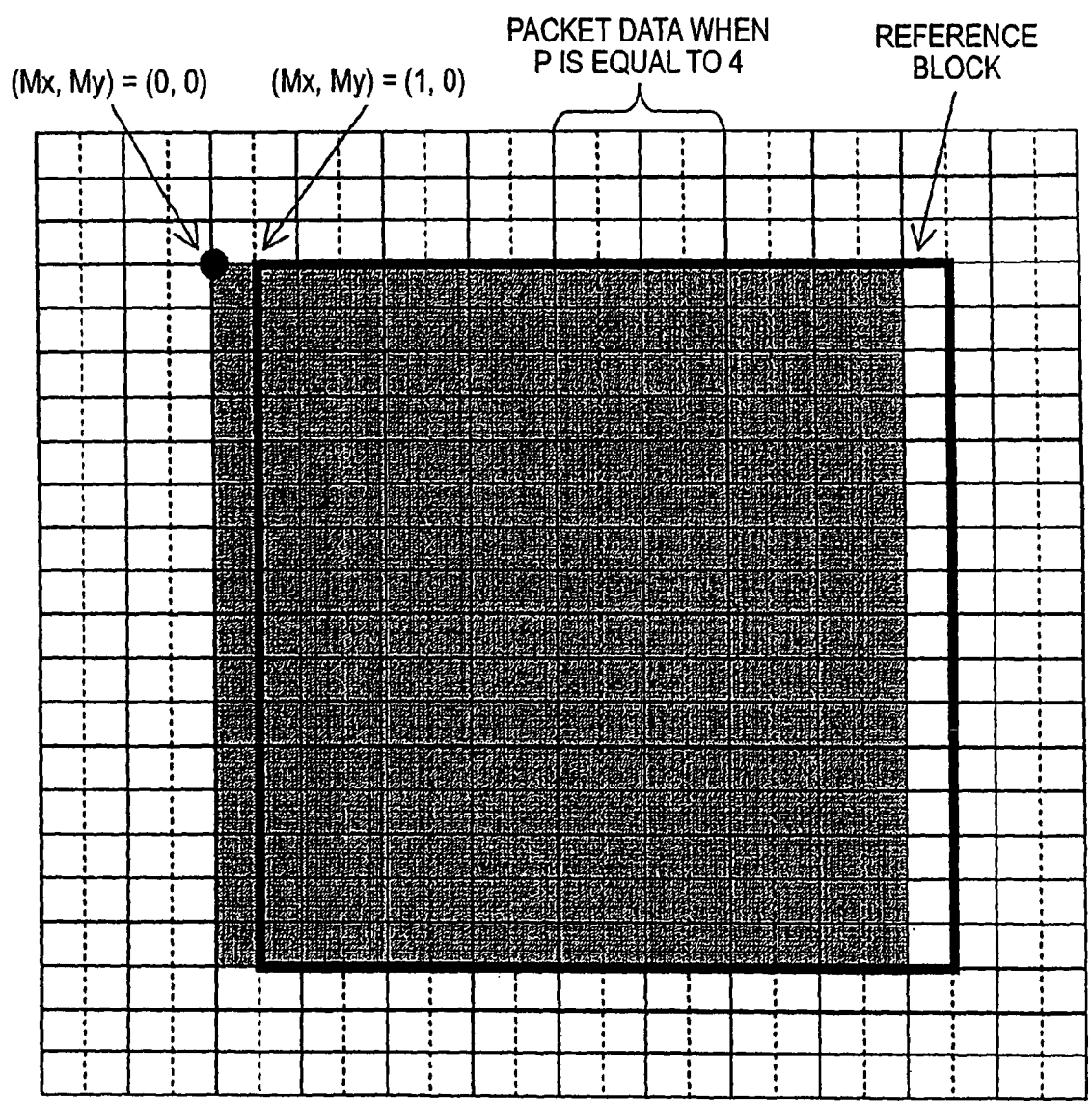
FIG. 4 is a diagram showing the reading range of reference data in a motion vector (Mx, My)=(1,0)
Figure 5:
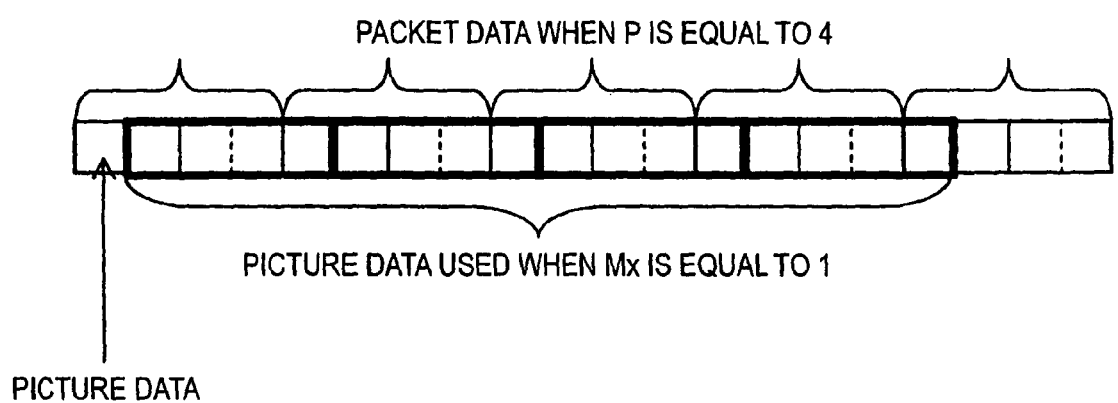
FIG. 5 is a diagram showing the relation between the reading range of the reference data in an arbitrary line in the motion vector (Mx, My)=(1,0) and packing data.
Figure 17:
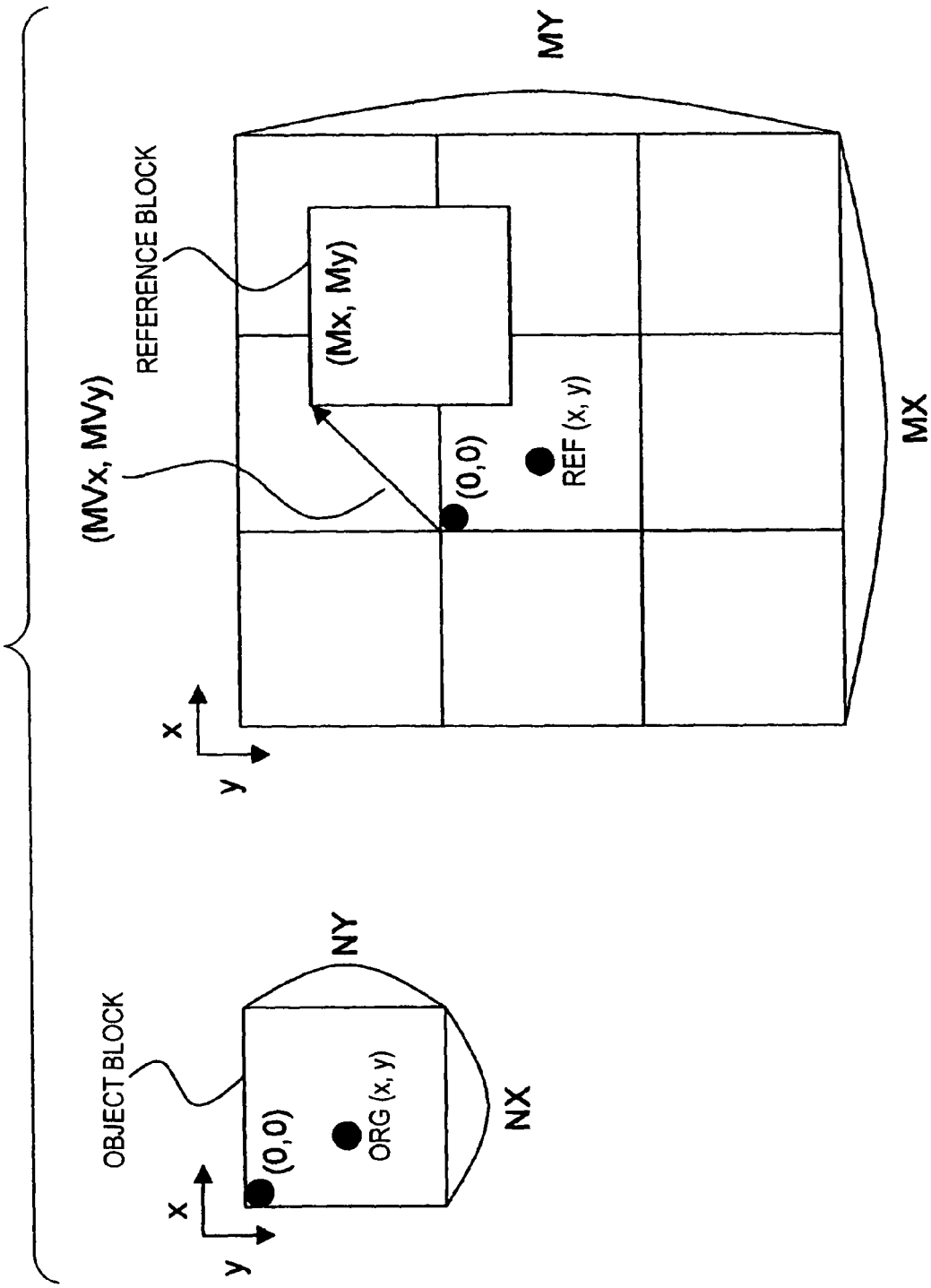
FIG. 17 is a diagram for explaining an ordinary motion vector estimating method.

However, in estimating the motion vector or in transferring the picture data to the predictive picture forming part 123, when Mx shown in FIG. 17 is a multiple of 4, the leftmost and upper data of the reference data read from the reference data storing unit 235 is the leftmost data of packet data, so that a problem does not arise. However, for instance, as shown in FIG. 4, when Mx is 1, the leftmost data of the reference data read from the reference data storing unit 235 is second data from the left of the packet data and the rightmost data is fourth data from the right of packet data, so that the four picture data of the leftmost packet data and the rightmost packet data cannot be read at the same time from the reference data storing unit 235 as shown in FIG. 5.

Figure 7:
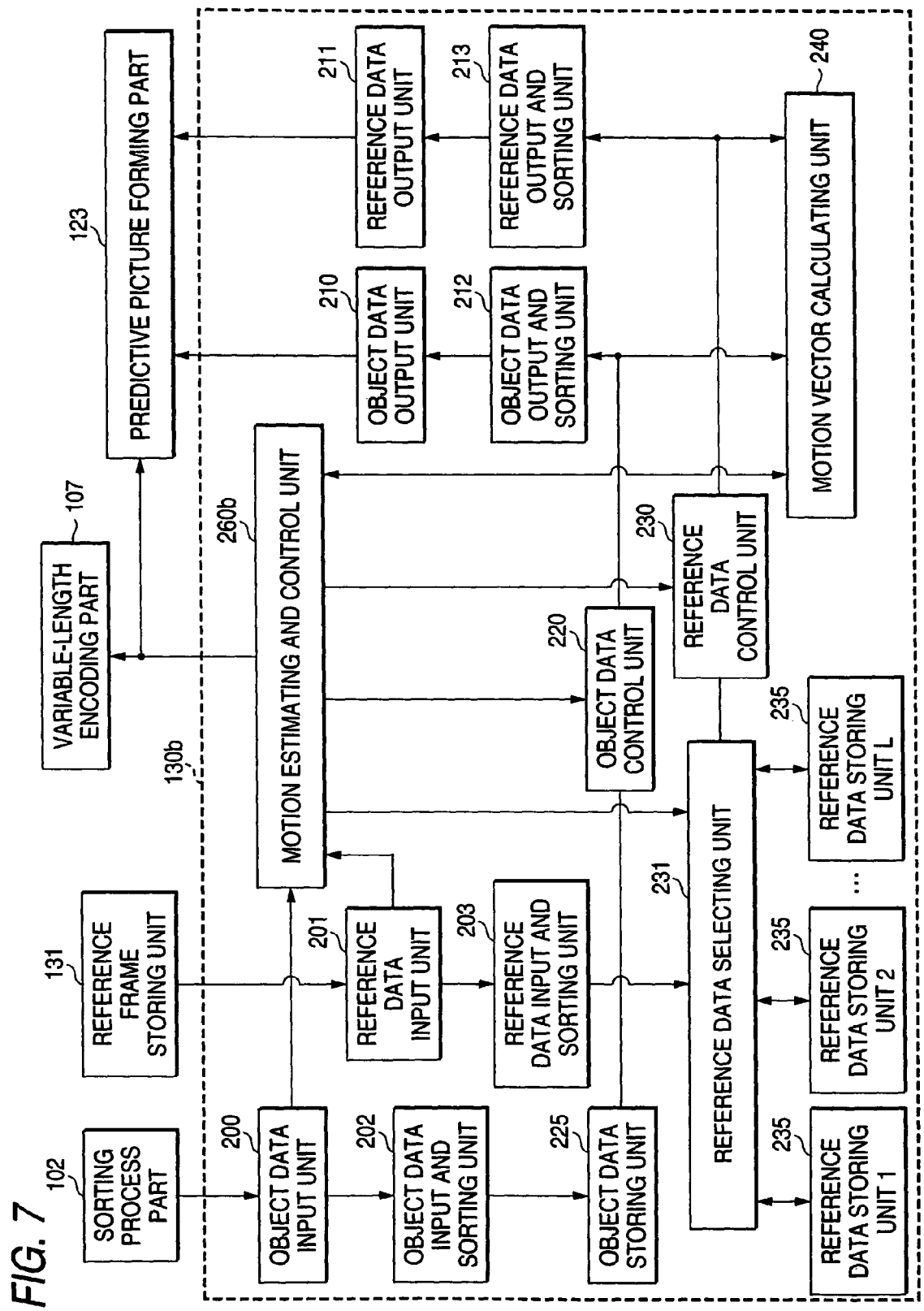
FIG. 7 is a block diagram showing a structure when the plurality of the reference data storing units are used in the motion vector estimator according to the first embodiment of the present invention.

In the above-described embodiment, only one reference data storing unit 235 is employed. However, to solve the above-described problem, a plurality of reference data storing units 235 are employed. FIG. 7 is a block diagram showing a structural example of a motion estimating part 130b using a plurality (L) of reference data storing units 235. As compared with FIG. 2, a reference data selecting unit 231 is added and a motion estimating and control unit 260b is updated.

The reference data selecting unit 231 properly allocates and writes the packet data supplied from a reference data input and sorting unit 203 to the reference data storing units 235 (the reference data storing unit 1 to the reference data storing unit L) on the basis of a signal from the motion estimating and control unit 206b. Further, the reference data selecting unit 231 reads the picture data allocated upon writing from the reference data storing unit 1 to the reference data storing unit L and transfers the picture data to a referenced at a control unit 230.

Figure 6:
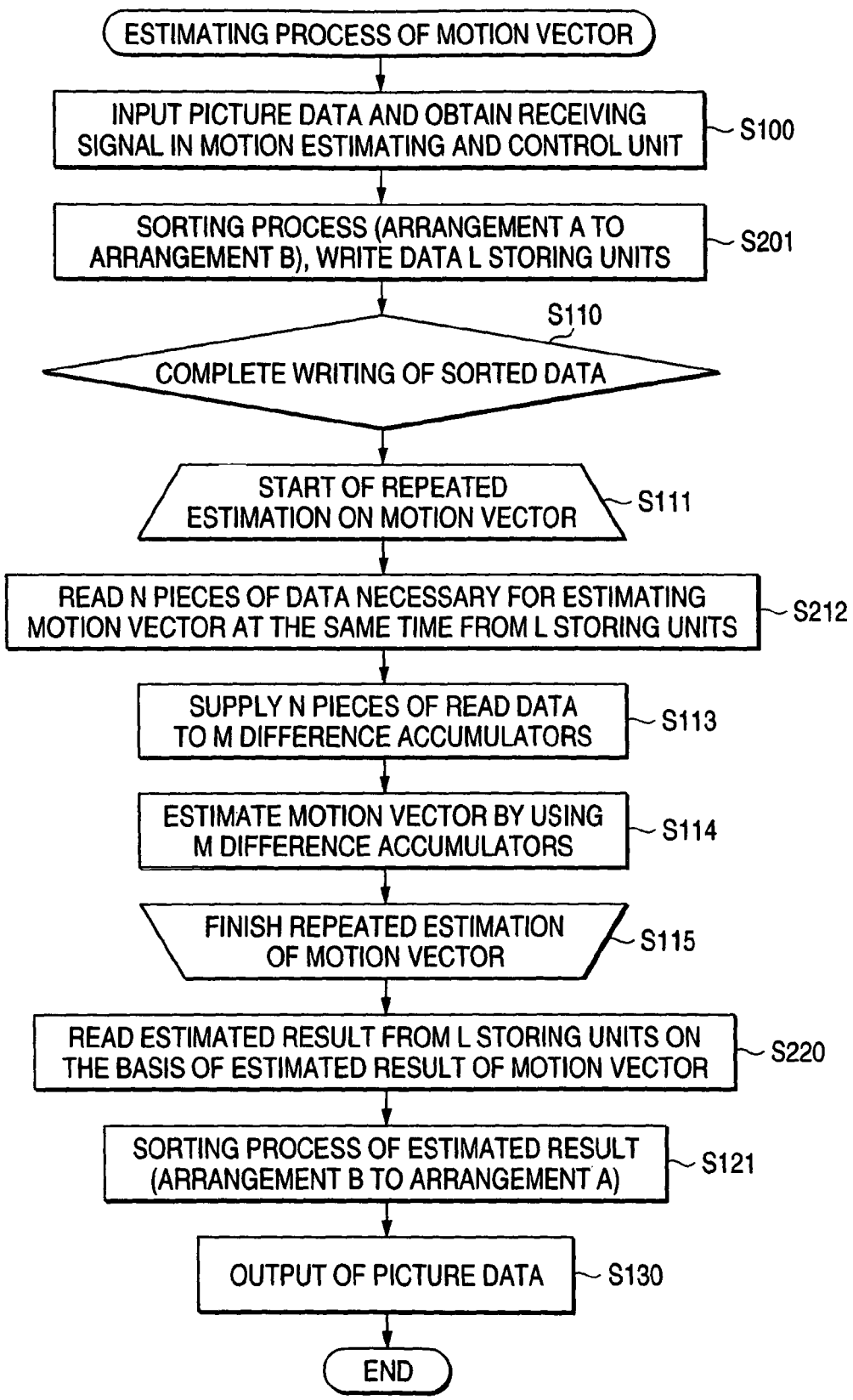
FIG. 6 is a flowchart for explaining processes when a plurality of reference data storing units are used in the motion vector estimator according to the first embodiment of the present invention.

FIG. 6 is a flowchart showing a motion vector estimating process of the motion estimating part 130b. Step S201, step S212 and step S220 are updated steps relative to FIG. 1 to treat the L reference data storing units 235.

As described above, the plurality of reference data storing units are used so that the four picture data can be read at the same time from the reference data storing units in the leftmost data or the rightmost data. Further, an active clock is controlled to be put into only the reference data storing unit in which the picture data needs to be read and written and a clock is controlled to be stopped to the reference data storing unit in which the picture data does not need to be read and written. Thus, wasteful consumed electric power can be reduced.

Figure 31:
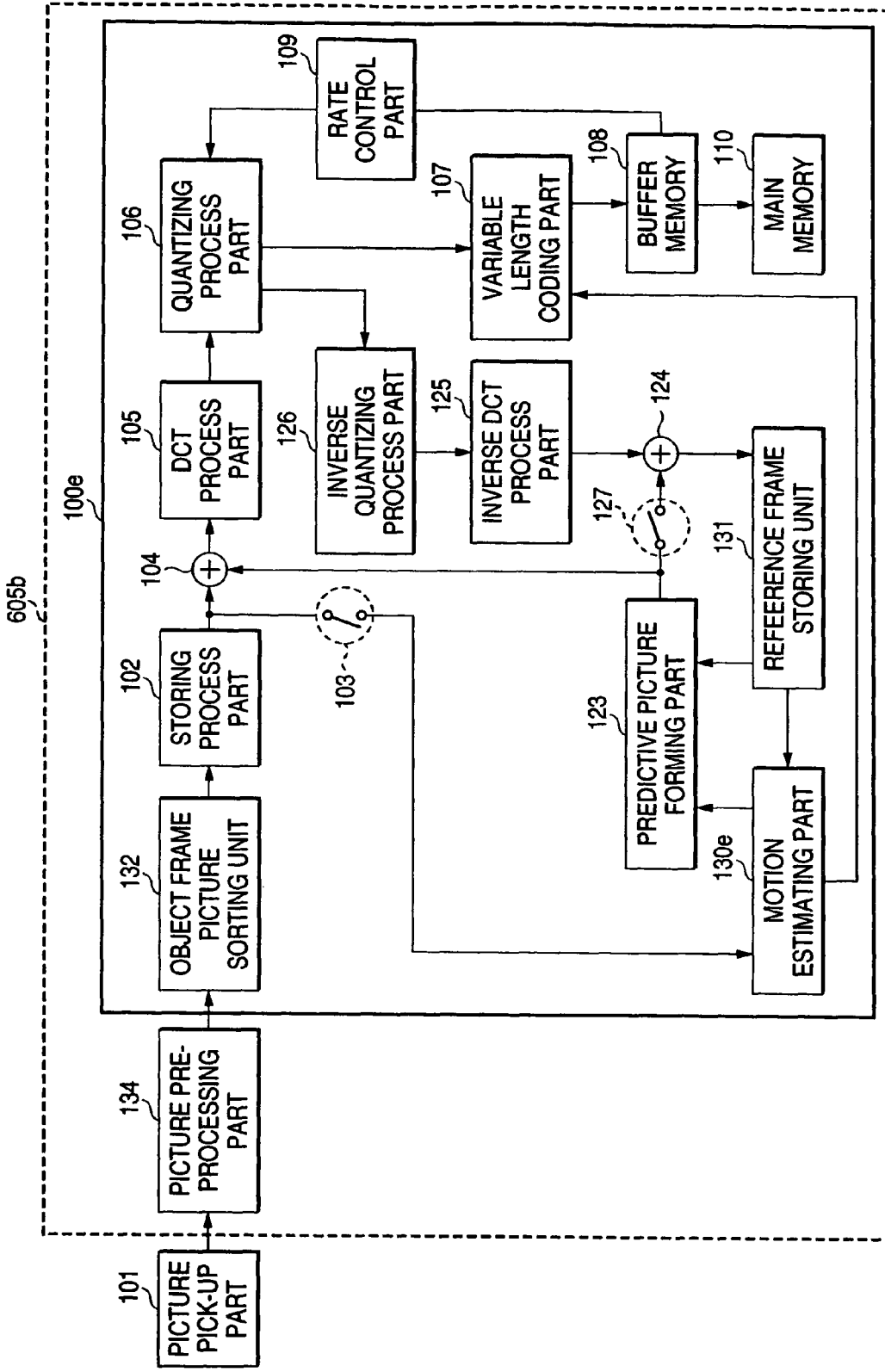
FIG. 31 is a diagram showing a picture processor in the motion vector estimator according to the first embodiment of the present invention.
Figure 32:
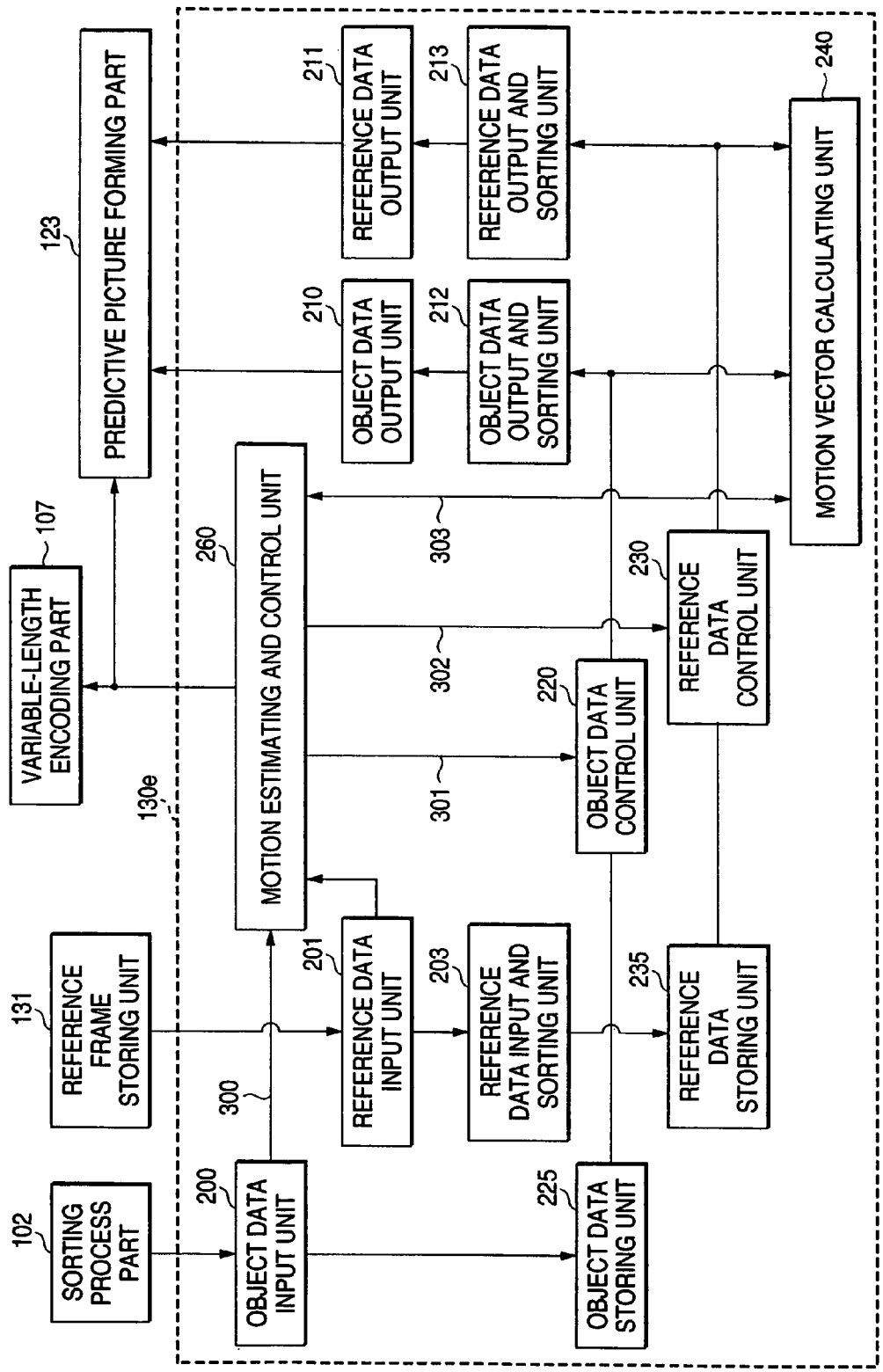
FIG. 32 is a diagram showing a picture processor in the motion vector estimator according to the first embodiment of the present invention.

Further, in the motion vector estimating part 130 of this embodiment, the method is illustrated in which the arrangement of the picture data of the object block inputted from the sorting process part 102 shows the arrangement A and the arrangement A is sorted to the arrangement B in the object data input and sorting unit 202 in the motion vector estimating part 130. It is to be understood that an object frame picture sorting unit 132 for sorting the arrangement A to the arrangement B may be provided before the object block is inputted to the motion vector estimating part 130, for instance, between the picture pick-up part 101 and the sorting process part 102, the arrangement of the picture data may be sorted to the arrangement B in the object frame picture sorting unit 132, and then, the picture data may be sent to the sorting process part 102 to form the object block and the object block may be inputted to a motion vector estimating part 130e. A picture processor 605*b* in this case is shown in FIG. 31 and the motion vector estimating part 130*e* is shown in FIG. 32. In this method, the object data input and sorting unit 202 is not necessary.

Figure 33:
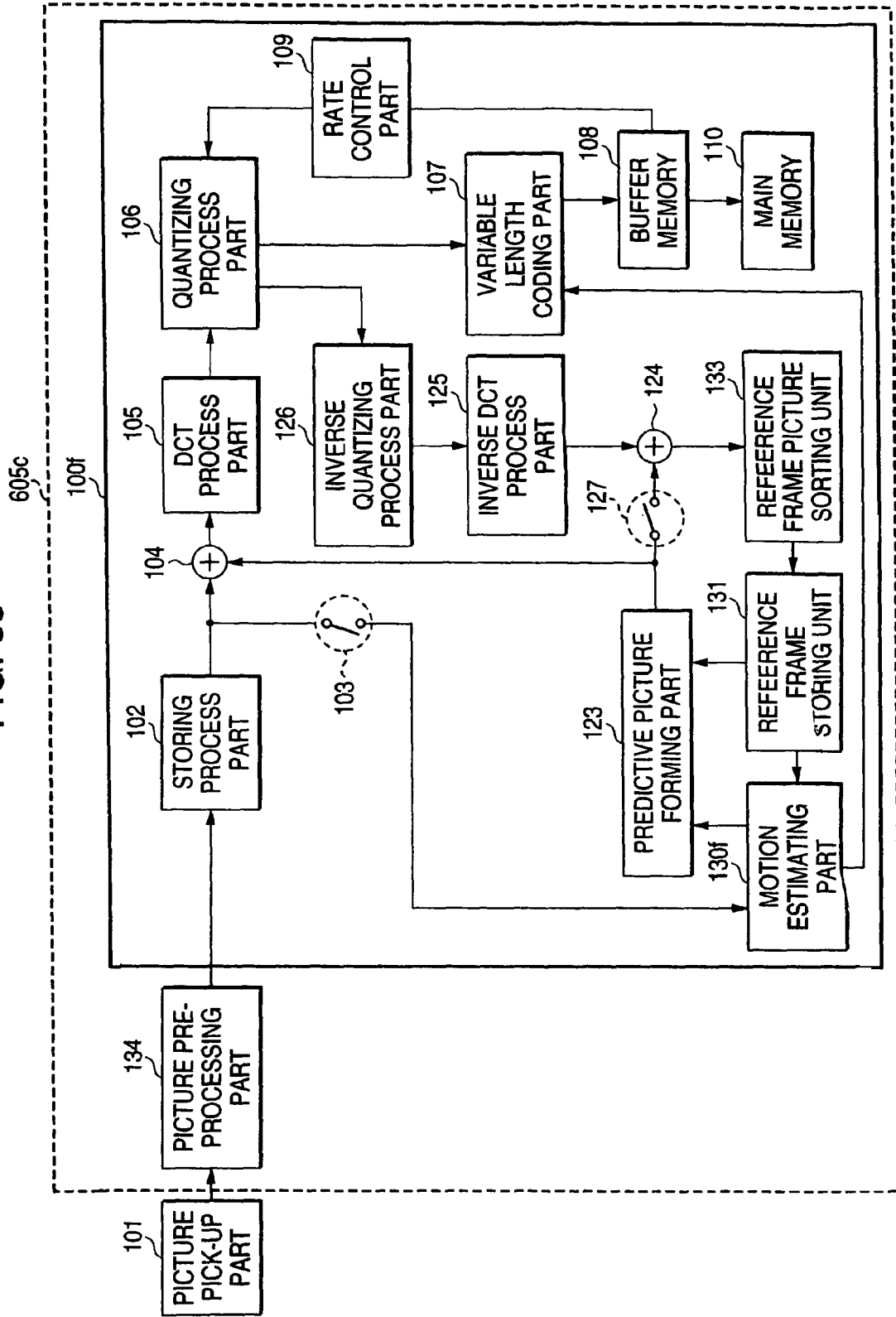
FIG. 33 is a diagram showing a picture processor in the motion vector estimator according to the first embodiment of the present invention.
Figure 34:
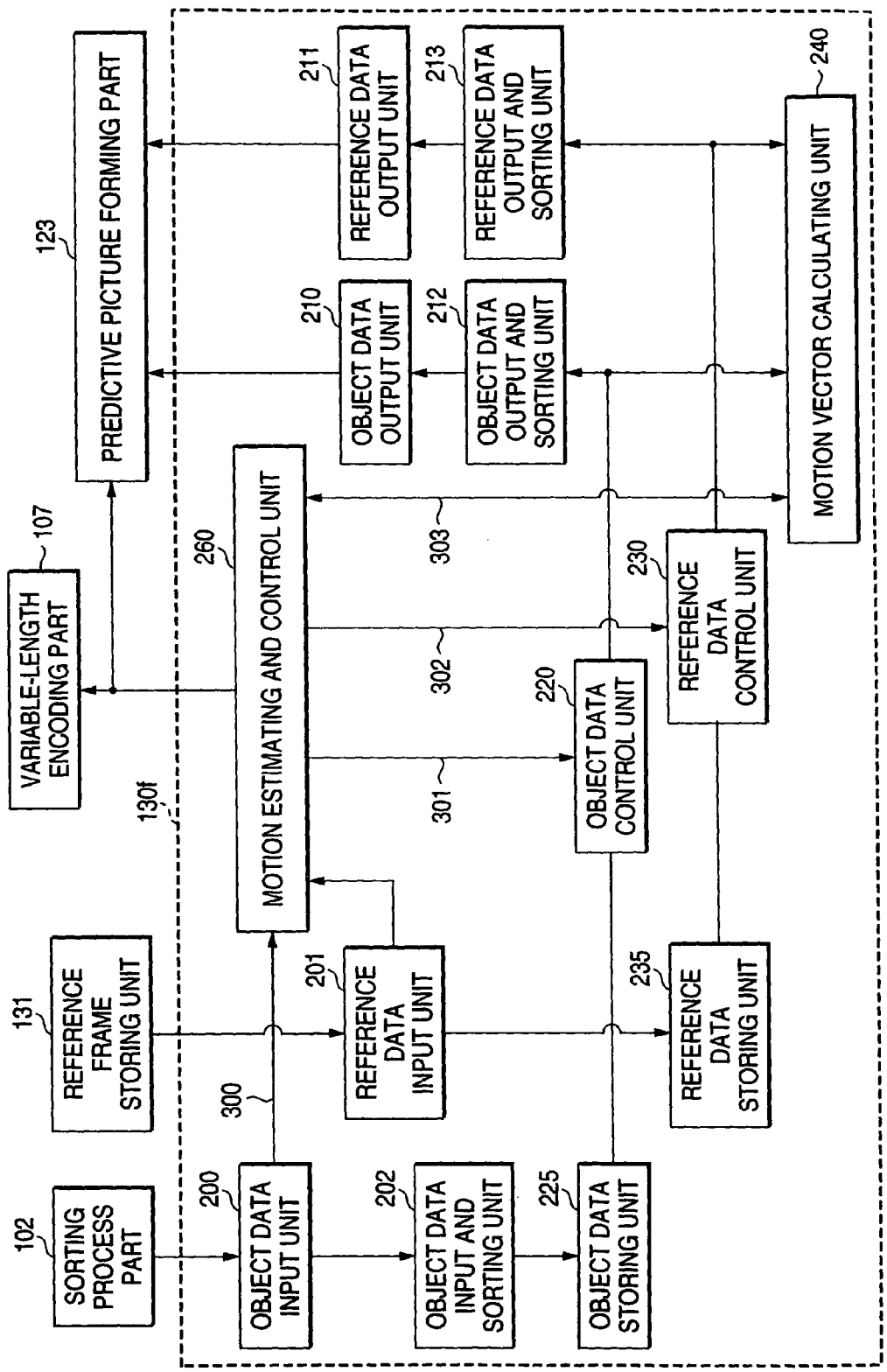
FIG. 34 is a diagram showing a motion vector estimating part in the motion vector estimator according to the first embodiment of the present invention.

Further, in this embodiment, the method is illustrated in which the arrangement of the picture data of the reference block inputted from the reference frame storing unit 131 shows the arrangement A and the arrangement A is sorted to the arrangement B in the reference data input and sorting unit 203 in the motion vector estimating part 130. However, it is to be understood that a reference frame picture sorting unit 133 for changing the arrangement A to the arrangement B may be provided before the reference block is inputted to the motion vector estimating part 130, for instance, between the addition process part 124 and the reference frame storing unit 131, the arrangement of the picture data may be changed to the arrangement B in the reference frame picture sorting unit 133, then, the picture data may be stored in the reference frame storing unit 131, and then, the reference block having the arrangement B may be read and inputted to a motion vector estimating part 130*f*. A picture processor 605*c* is shown in FIG. 33 and the motion vector estimating part 130*f* is shown in FIG. 34. In this method, the reference data input and sorting unit 203 is not necessary.

Second Embodiment

Figure 18:
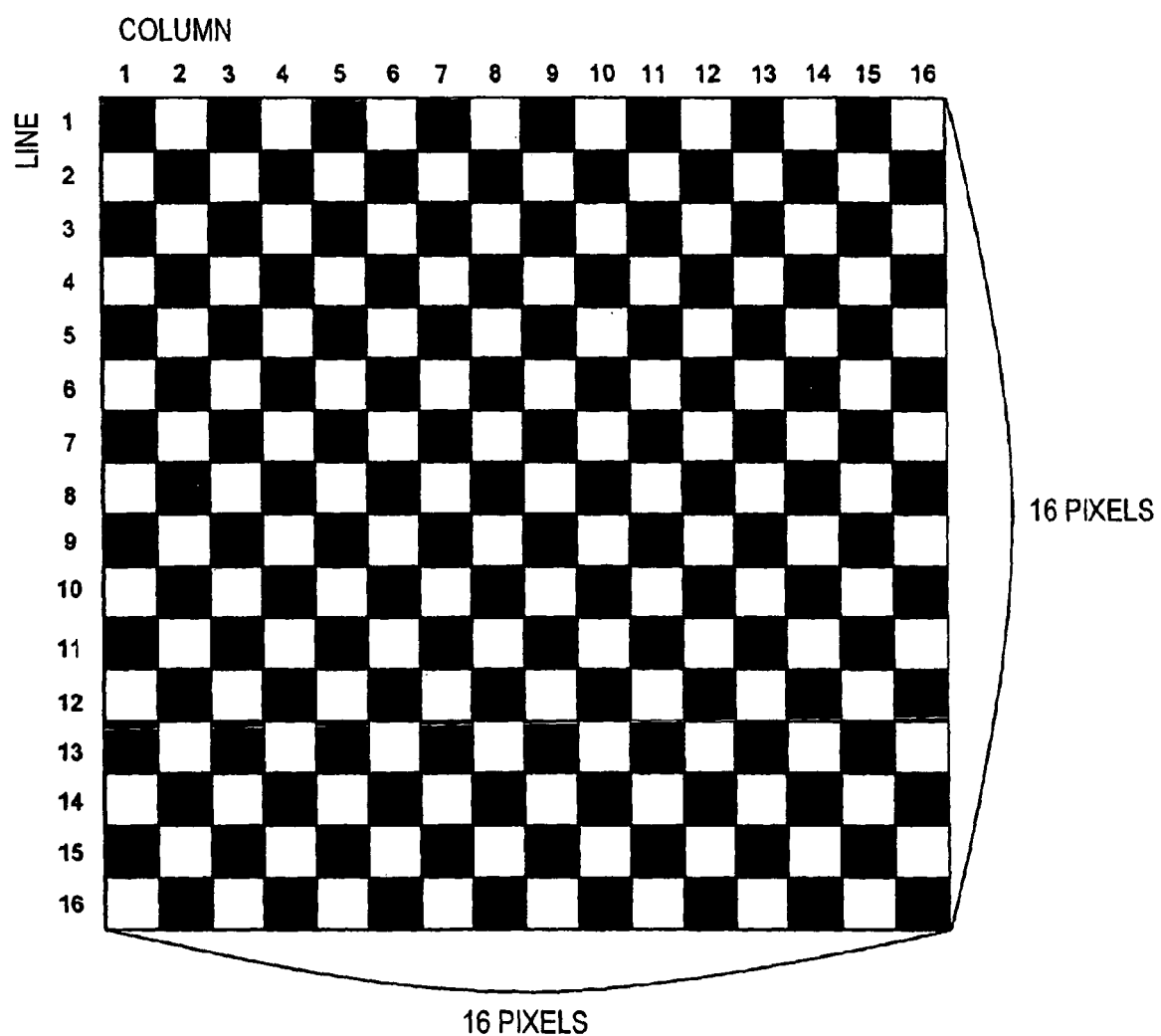
FIG. 18 is a diagram for explaining a sub-sampling process of checkered pattern.
Figure 21:
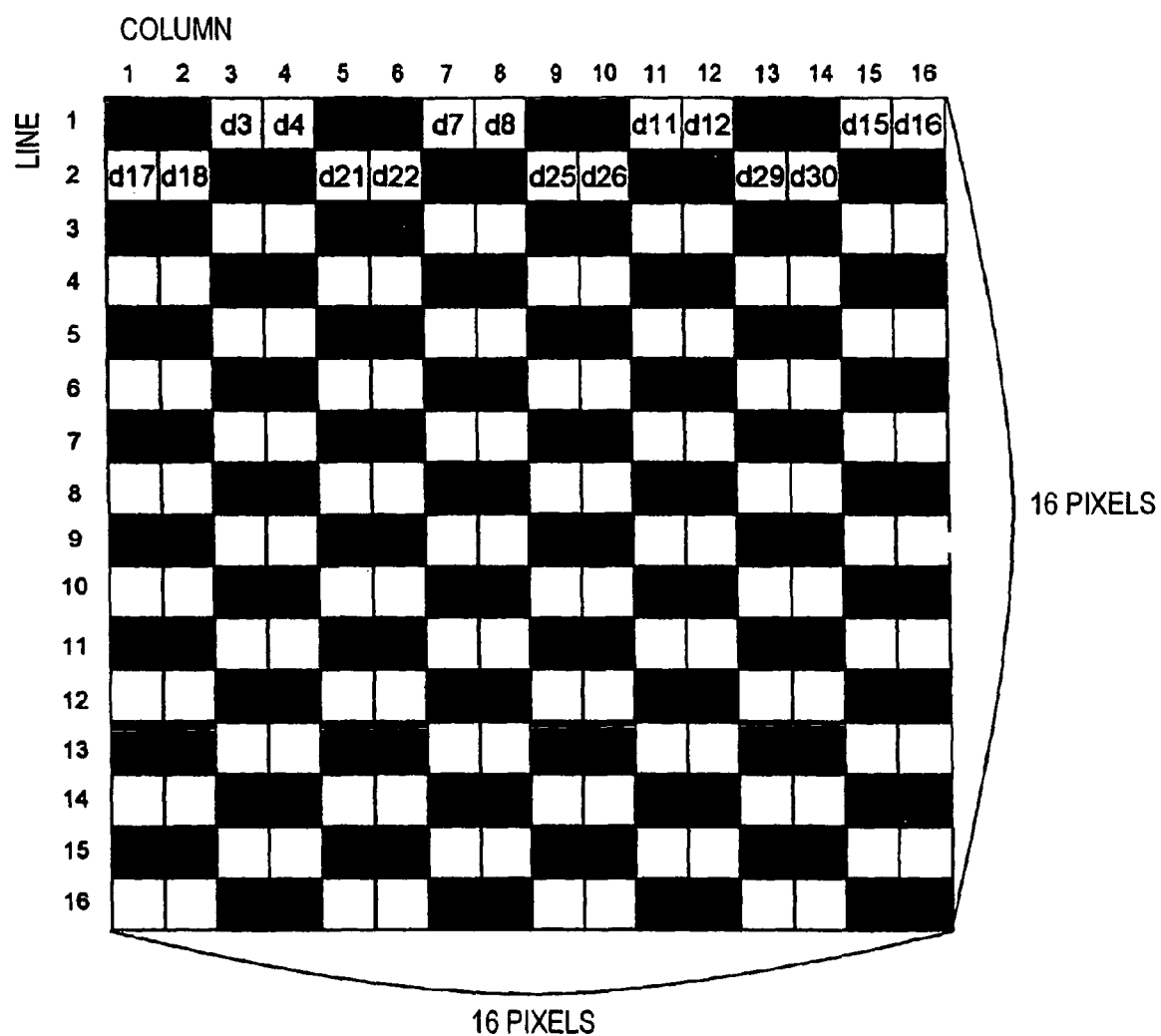
FIG. 21 is a diagram showing an example of a sub-sampling process effective for calculating an evaluation function at high speed.
Figure 22:
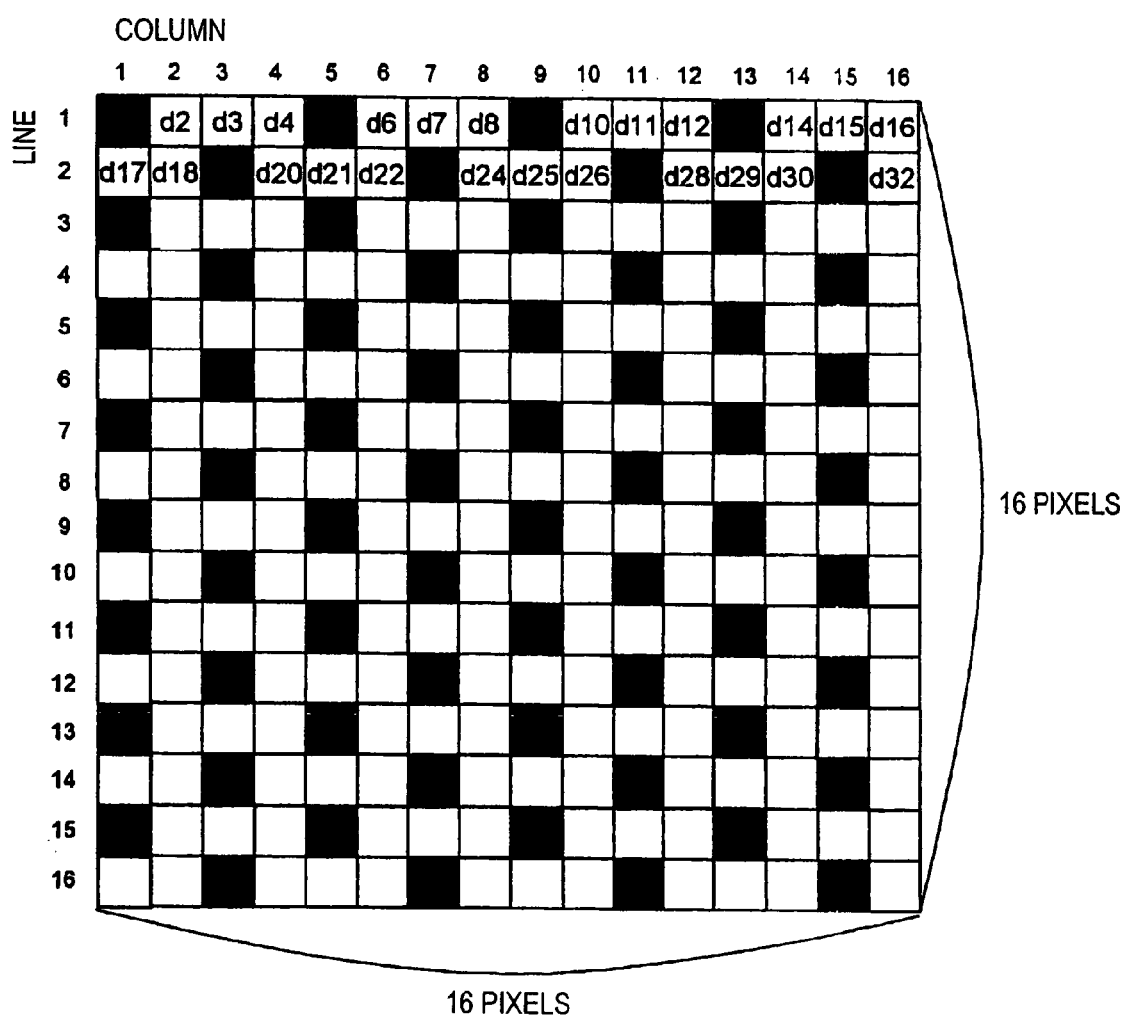
FIG. 22 is a diagram showing an example of a sub-sampling process effective for calculating an evaluation function at high speed.
Figure 23:
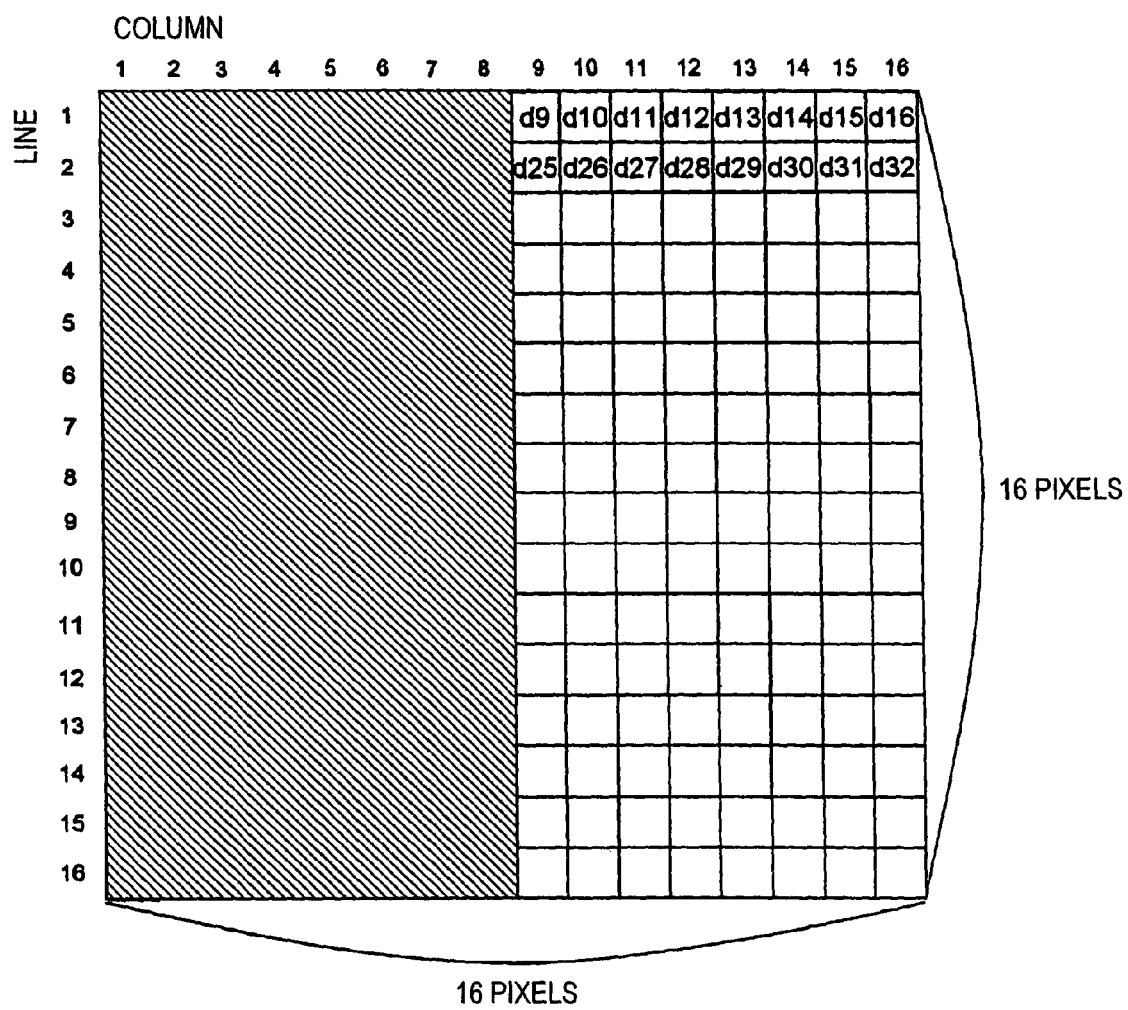
FIG. 23 is a diagram showing an example of a sub-sampling process effective for calculating an evaluation function at high speed.
Figure 24:
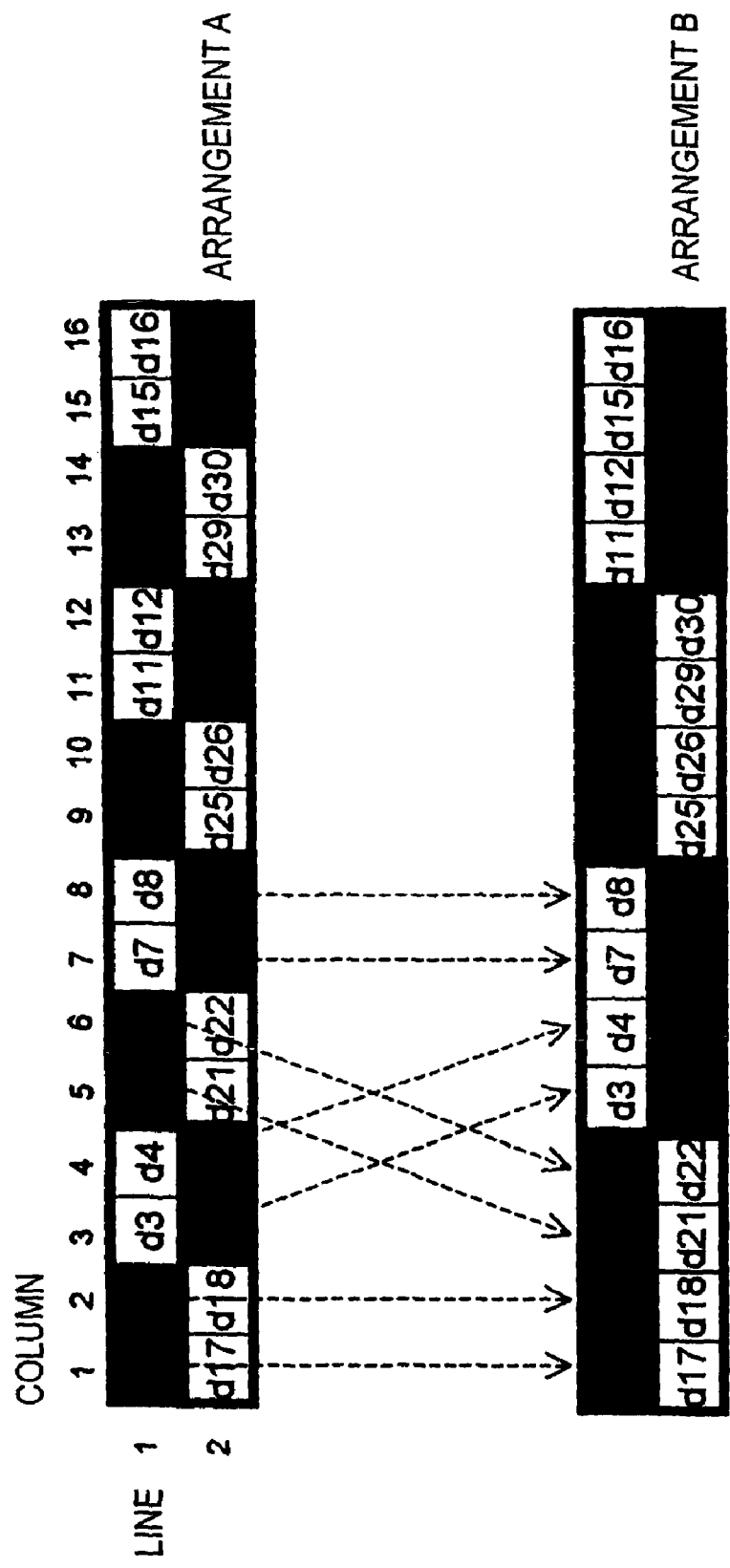
FIG. 24 is a diagram showing a sorting process corresponding to the sub-sampling process shown in FIG. 21.
Figure 25:
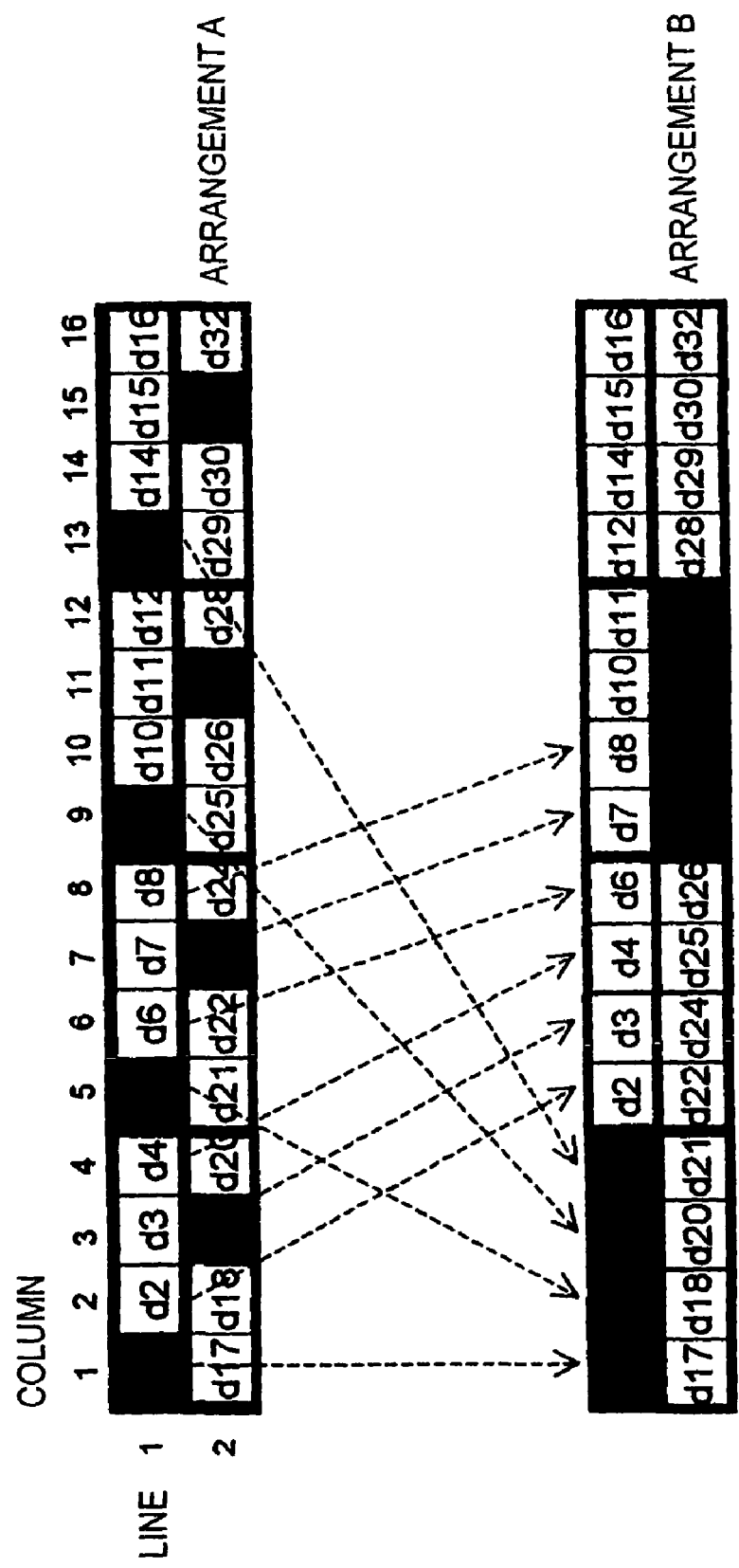
FIG. 25 is a diagram showing a sorting process corresponding to the sub-sampling process shown in FIG. 22.
Figure 26:
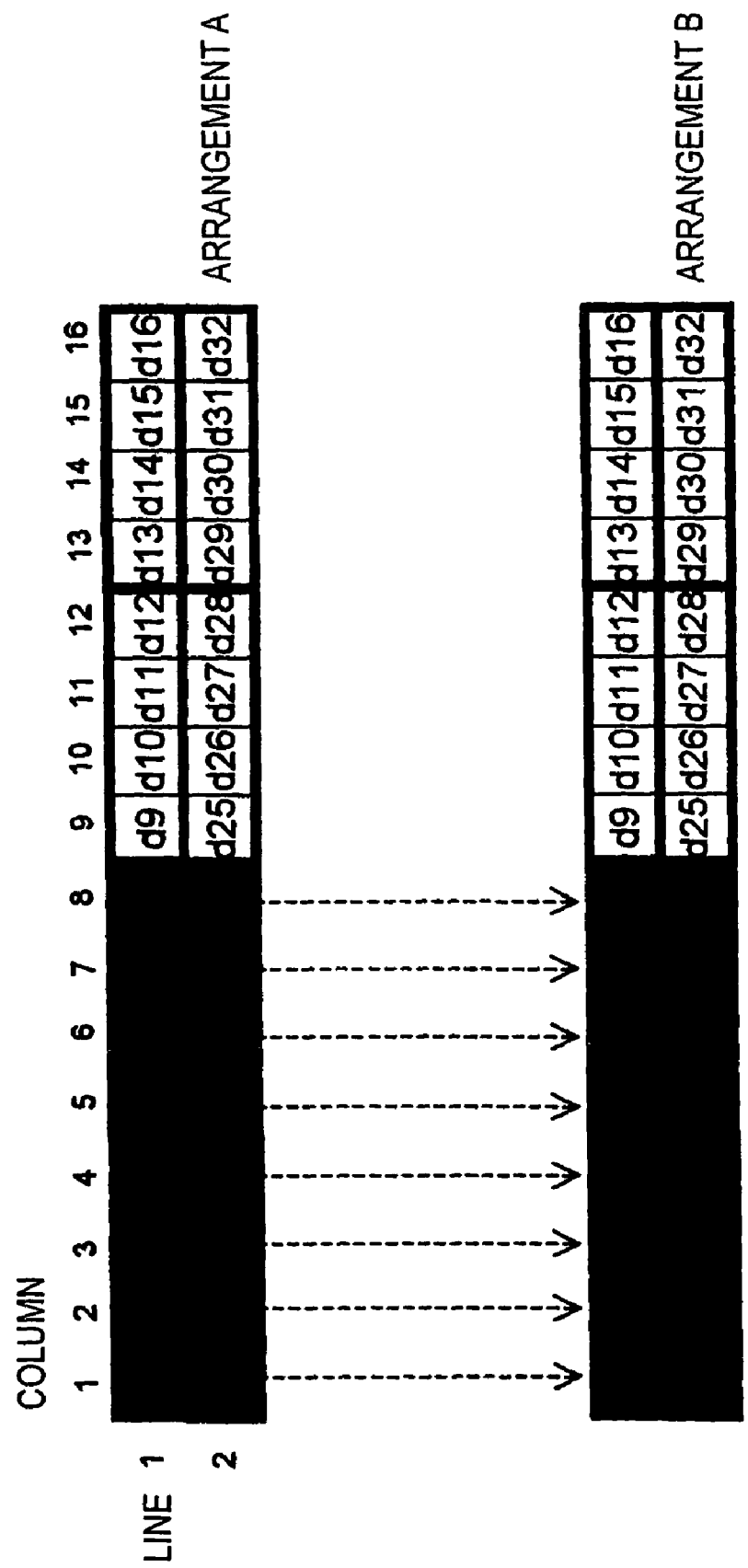
FIG. 26 is a diagram showing a sorting process corresponding to the sub-sampling process shown in FIG. 23.

A pixel sub-sampling method effective for estimating the motion vector at high speed is not limited to the pixel sub-sampling method having a checkered pattern shown in FIG. 18. For instance, pixel sub-sampling methods shown in FIGS. 21 to 23 are also effective for calculating an evaluation function at high speed. In this case, the packing data of four data needs to be sorted as shown in FIGS. 24 to 26 respectively in place of the sorting method shown in FIG. 13.

Figure 8:
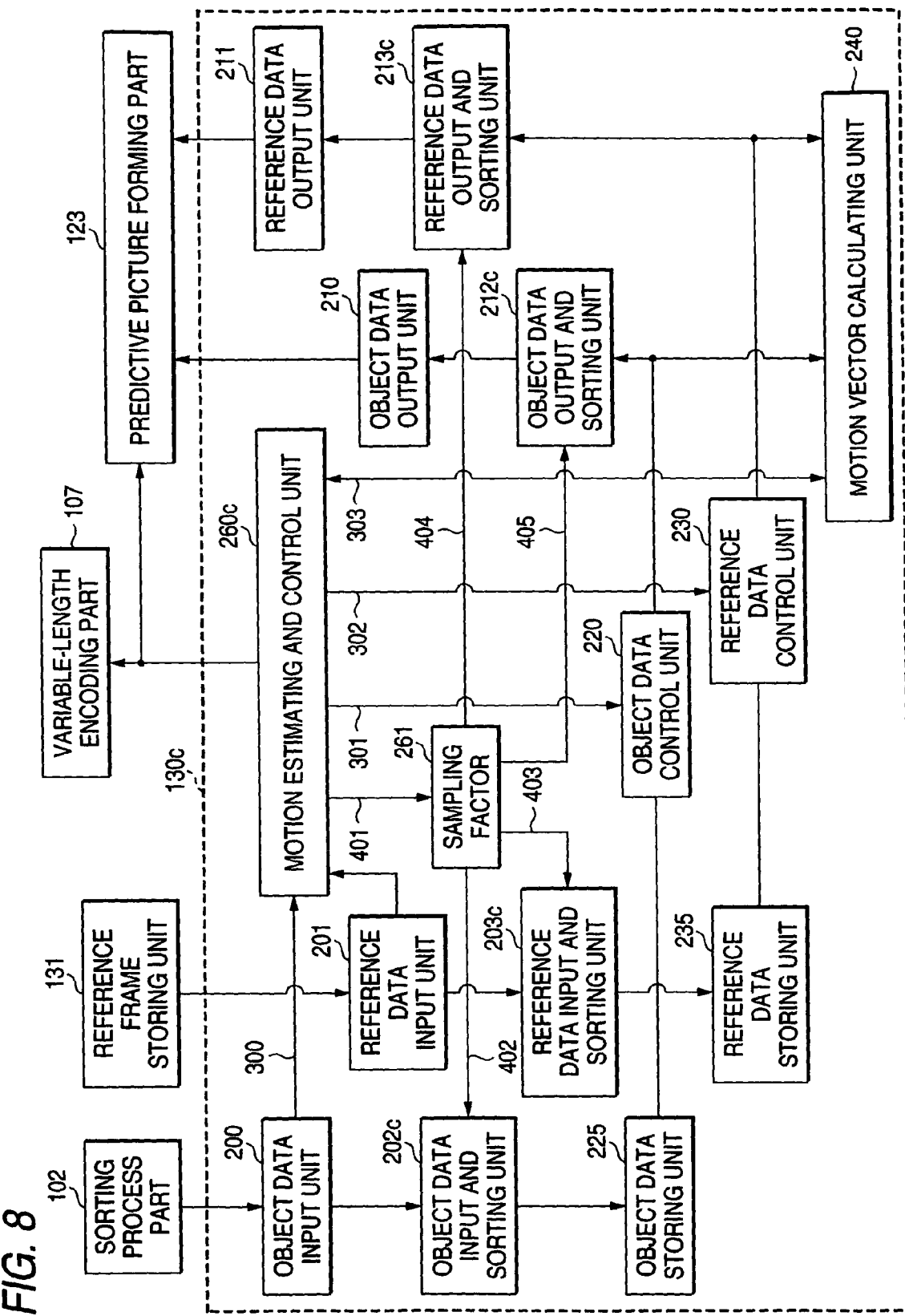
FIG. 8 is a block diagram showing the structure of a motion vector estimator according to a second embodiment of the present invention.

In the second embodiment, sorting processes to various arrangements according to the pixel sub-sampling method can be realized. FIG. 8 is a block diagram showing the structure of a motion vector estimator according to the second embodiment of the present invention and a specific structural example of the motion estimating part 130 shown in FIG. 19 in this embodiment.

In FIG. 8, a motion estimating part 130*c* includes a motion estimating and control unit 260*c*, a sampling factor 261, a motion vector calculating unit 240, an object data control unit 220, an object data input unit 200, an object data input and sorting unit 202*c*, an object data storing unit 225, an object data output and sorting unit 212*c*, an object data output unit 210, a reference data control unit 230, a reference data input unit 201, a reference data input and sorting unit 203*c*, a reference data storing unit 235, a reference data output and sorting unit 213*c* and reference data output unit 211.

In the motion estimating part 130*c* in FIG. 8, the sampling factor 261 is added to the structure of the motion estimating part 130 shown in FIG. 2. As for a control according to the pixel sub-sampling method, the motion estimating and control unit 260*c*, the object data input and sorting unit 202*c*, the object data output and sorting unit 212*c*, the reference data input and sorting unit 203*c* and the reference data output and sorting unit 213*c* are updated.

The sampling factor 261 decides, to realize a sorting process to various kinds of arrangements, which data is valid data and which data is invalid data in the four data of the packing data to output an instruction to the object data input and sorting unit 202*c* and the reference data input and sorting unit 203*c* so as to perform the sorting process. Further, upon outputting picture data after a motion vector is estimated, the sampling factor 261 outputs an instruction to the object data output and sorting unit 212*c* and the reference data output and sorting unit 213*c* to return picture data to an original arrangement.

Figure 27:
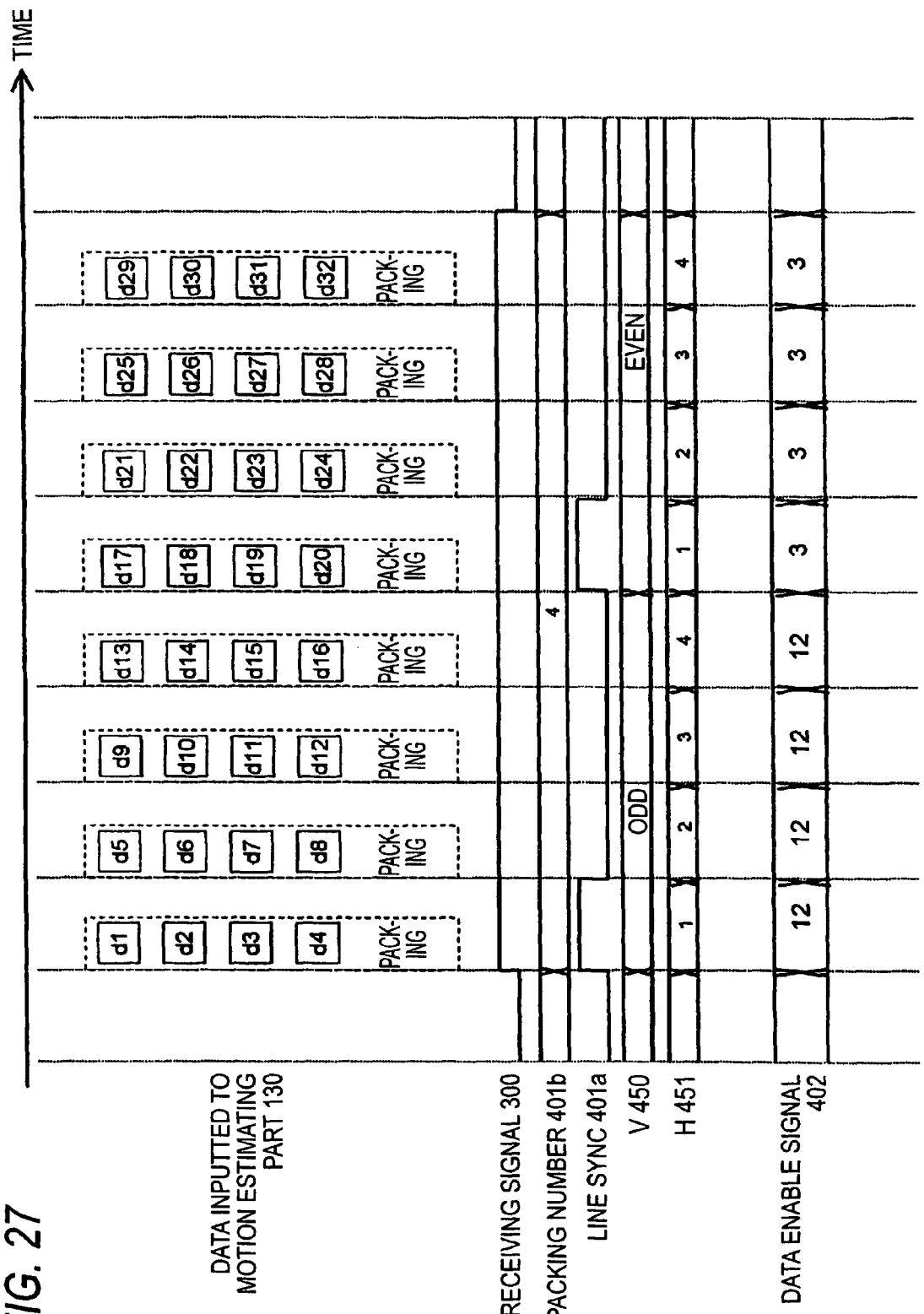
FIG. 27 is a timing chart for explaining a control operation related to a sampling factor.

FIG. 27 is a timing chart for explaining a control operation related to the sampling factor 261. The motion estimating and control unit 260*c* has the structure information of the packing data. When the motion estimating and control unit receives a receiving signal 300 from the object data input unit 200 and the reference data input unit 201, the motion estimating and control unit 260*c* transfers a line sync signal 401*a* as a synchronizing signal for each line and a packing number 401*b* showing the number P of packs as the number of the picture data in the packing data together with the receiving signal 300 to the sampling factor 261 by a control signal line 401.

The sampling factor 261 receives the three signals from the motion estimating and control unit 260*c* and uses an input data enable signal forming table provided in the sampling factor 261 to form data enable signals 402 and 403 so as to perform a suitable sorting process in the object data input and sorting unit 202*c* and the reference data input and sorting unit 203*c*. Then, the sampling factor 261 transmits the data enable signals respectively to the object data input and sorting unit 202*c* and the reference data input and sorting unit 203*c*.

Figure 16:
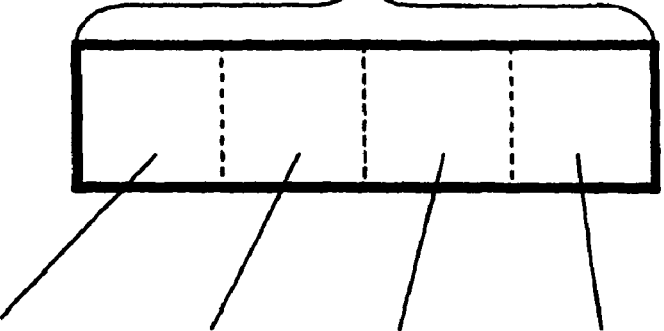
FIG. 16 is a diagram showing codes of data enable signals when a packing number is 4.

FIG. 16 is a diagram showing codes of the data enable signals when the packing number 401*b* is 4. The object data input and sorting unit 202*c* and the reference data input and sorting unit 203*c* can respectively grasp which part of the picture data of the packing data supplied from the object data input unit 200 and the reference data input unit 201 is valid in accordance with the data enable signals 402 and 403 to suitably sort the picture data.

Figure 28:
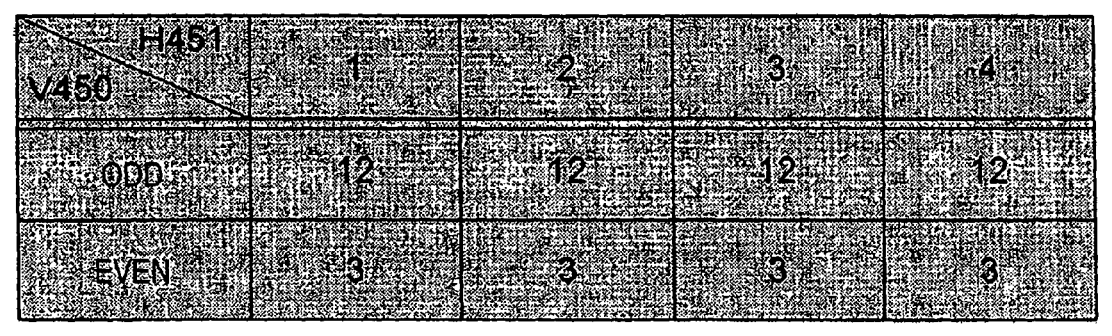

FIG. 27 more specifically shows a method for forming a data enable signal when the evaluation function is calculated by a sampling method shown in FIG. 21. FIG. 28 is a diagram showing the contents of the input data enable signal forming table used at that time.

The sampling factor 261 generates control signals V450 and H451 from the receiving signal 300, the packing number 401*b* and the line sync signal 401*a*. Every time the line sync signal 401*a* is received, the value of the control signal V450 is switched to an "odd" value and an "even" value. When the receiving signal 300 is received, the value of the control signal H451 is incremented by 1. When the line sync signal 401*a* is received, the value of the control signal H451 is initialized to "1". The control signals V450 and H451 are used to generate the data enable signal 402 by the input data enable signal forming table shown in FIG. 28.

A control by the data enable signal 402 is specifically explained below. In a first transfer, the packing data (d1, d2, d3, d4) is inputted and the data enable signal 402 shows "12". This "12" is decoded in accordance with FIG. 16 to obtain (valid, valid, invalid, invalid). The object data input and sorting unit 202*c* and the reference data input and sorting unit 203 can decide that necessary (valid) data of the transfer data is (d1, d2) and unnecessary (invalid) data is (d3, d4).

Every time the four data of the necessary data or the unnecessary data is stored, the object data input and sorting unit 202*c* and the reference data input and sorting unit 203*c* writes the four data in the object data storing unit 225 or the reference data storing unit 235 as one packing data.

Now, a control operation of the sampling factor 261 when an object block or a reference block is outputted from the motion estimating part 130*c* will be described below.

In this case, the motion estimating and control part 260*c* transfers a transmitting signal generated therein, a packing number 401*a* and a line sync signal 401*b* to the sampling factor 261. The sampling factor 261 generates control signals V450 and H451 from these signals. The sampling factor uses the control signals to generate output data enable signals 404 and 405 in accordance with an output data enable signal forming table and outputs the output data enable signals to the object data output and sorting unit 212c and the reference data output and sorting unit 213c.

In the output data enable signal forming table, table data needs to be prepared so that object data and a reference block in which a sorting process from an arrangement A to an arrangement B is carried out in the object data input and sorting unit 202c and the reference data input and sorting unit 203c can be returned to the arrangement A before the sorting process.

However, when a complicated sorting process is carried out in the object data input and sorting unit 202c and the reference data input and sorting unit 203c, a process in the object data output and sorting unit 212c and the reference data output and sorting unit 213c is more complicated. Therefore, in the output data enable signal forming table, the pixel positions of the original arrangement A are stored respectively in the pixel positions of even number lines and odd number lines.

Figure 29:
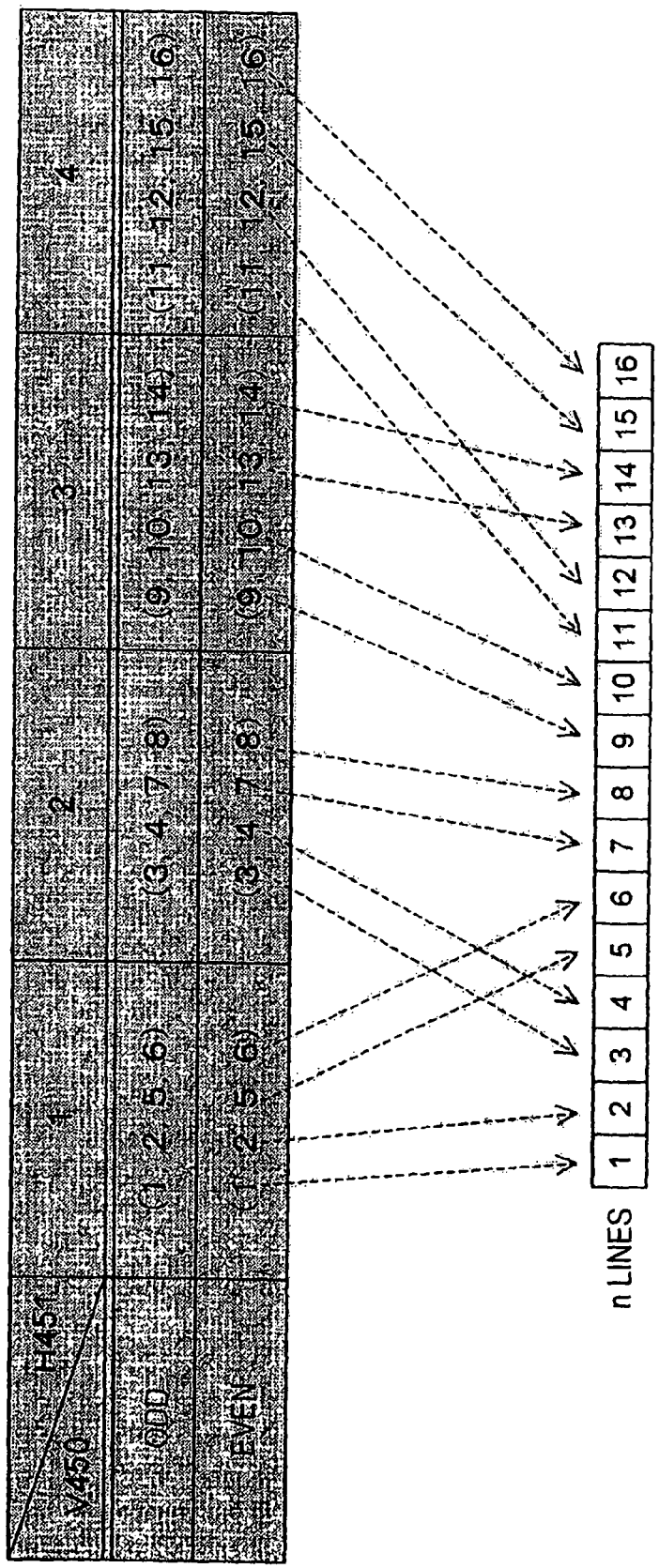
FIG. 29 is a diagram showing the contents of an output data enable signal forming table corresponding to the sub-sampling process shown in FIG. 21.

FIG. 29 shows the contents of the output data enable signal forming table corresponding to a sampling pattern shown in FIG. 21. In this case, the contents of the even number lines are unexpectedly the same as those of the odd number lines. Control information for instructing the sorting process includes the output data enable signals 404 and 405.

The data of the arrangement B inputted to the object data output and sorting unit 212 or the reference data output and sorting unit 213 are supplied in regular order as follows:

(d1, d2, d5,d6), (d3, d4, d7, d8), (d9, d10, d13, d14), (d11, d12, d15, d16).

For the first input data (d1, d2, d5, d6), (1, 2, 5, 6) is obtained from the output data enable signal forming table. These figures show pixel positions after the sorting process in a line. This means that the input data d1 is sorted to a leftmost pixel position 1, the input data d2 is sorted to a second pixel position 2 from the left, the input data d5 is sorted to a fifth pixel position 5 from the left, and the input data d6 is sorted to a sixth pixel position 6 from the left. In such a way, the original arrangement A can be reproduced.

Figure 30:
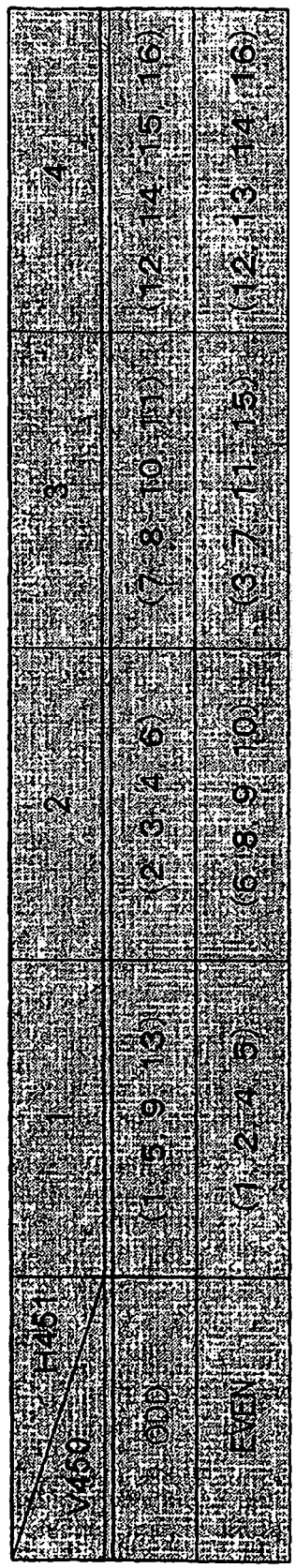
FIG. 30 is a diagram showing the contents of an output data enable signal forming table corresponding to the sub-sampling process shown in FIG. 22.

In other sampling method, an output data enable signal forming table corresponding thereto is employed so that the arrangements B of all patterns can be sorted to the arrangements A. For instance, FIG. 30 is a diagram showing the contents of an output data enable signal forming table corresponding to a sampling pattern shown in FIG. 22.

As described above, the motion vector estimator of this embodiment is used so that the packing data of the object data and the reference data is sorted correspondingly to an arbitrary sampling pattern in accordance with the input data enable signal forming table and the output data enable signal forming table incorporated in the sampling factor. Accordingly, a calculating process speed for estimating a motion vector can be greatly improved.

Further, even when the sampling method is changed, the input data enable signal forming table and the output data enable signal forming table incorporated in the sampling factor are merely changed so that a suitable sorting process can be performed.

Third Embodiment

Figure 10:
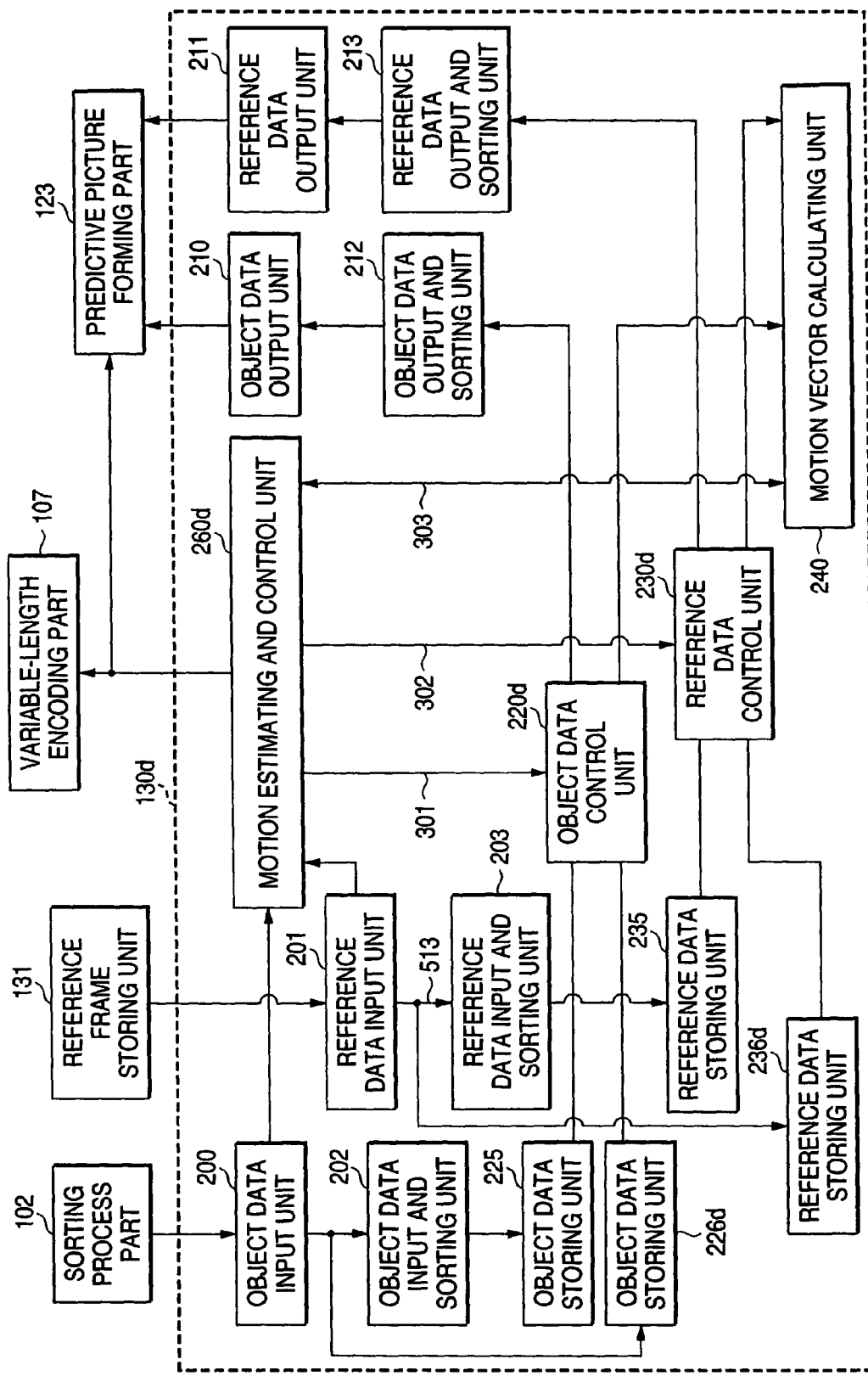
FIG. 10 is a block diagram showing the structure of the motion vector estimator according to the third embodiment of the present invention.

FIG. 10 is a block diagram showing the structure of a motion vector estimator according to a third embodiment of the present invention and a specific structural example of the motion estimating part 130 shown in FIG. 19. In this embodiment, a second object data storing unit and a second reference data storing unit for storing picture data of an arrangement A are provided as well as an object data storing unit and a reference data storing unit for storing picture data whose arrangement is changed to an arrangement B to estimate a motion vector. Thus, the picture data of the arrangement A can be outputted without performing a sorting process after the motion vector is estimated.

In FIG. 10, a motion estimating part 130d includes a motion estimating and control unit 260d, a motion vector calculating unit 240, an object data control unit 220d, an object data input unit 200, an object data input and sorting unit 202, an object data storing unit 225, a second object data storing unit 226d, an object data output unit 210, a reference data control unit 230d, a reference data input unit 201, a reference data input and sorting unit 203, a reference data storing unit 235, a second reference data storing unit 236d and a reference data output unit 211.

In the motion estimating part 130c in FIG. 10, the second object data storing unit 226d and the second reference data storing unit 236d are added to the structure of the motion estimating part 130 shown in FIG. 2. The object data output and sorting unit 212 and the reference data output and sorting unit 213 are deleted. The motion estimating and control unit 260d, the object data control unit 220d and the reference data control unit 230d are updated.

Figure 9:
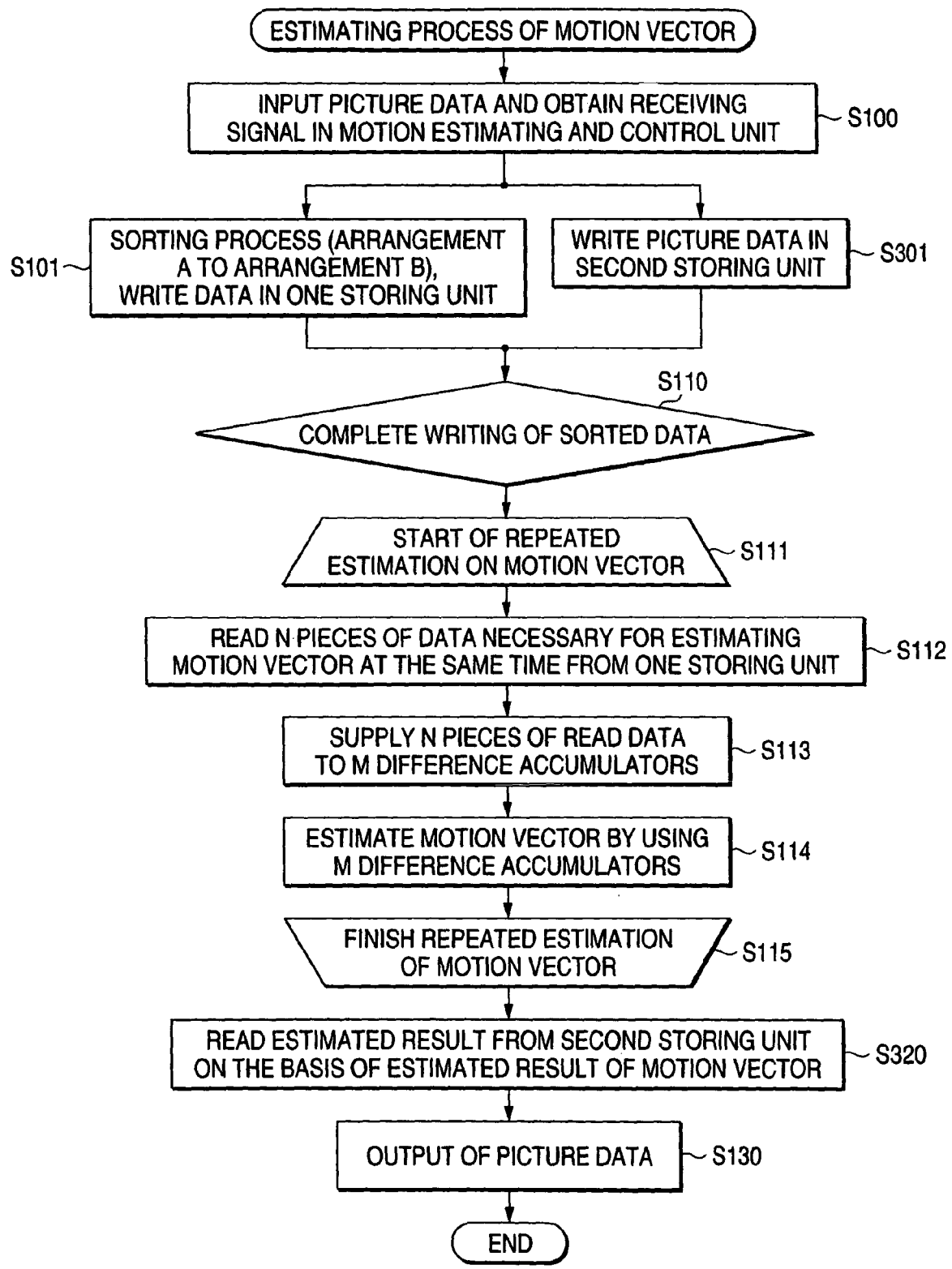
FIG. 9 is a flowchart for explaining the processes of a motion vector estimator according to a third embodiment of the present invention.

FIG. 9 is a flowchart showing a motion vector estimating process of the motion estimating part 130d. In FIG. 9, step S301 is a step added to FIG. 1 to store the picture data of the arrangement A in the second object data storing unit and the second reference data storing unit. Further, step S320 is a step updated relative to FIG. 1 to output the picture data or the arrangement A without performing a sorting process after a motion vector is estimated.

As described above, the motion vector estimator of this embodiment is employed so that the picture data of the arrangement B can be read at high speed upon estimating the motion vector and the picture data of the arrangement A can be outputted without performing the sorting process upon outputting a result after the motion vector is estimated. Thus, a data sorting device is not required upon outputting data.

Fourth Embodiment

FIG. 35 is a block diagram showing the structure of a picture pick-up system 601, for instance, a digital still camera (DSC) according to a fourth embodiment of the present invention. A picture processor 605 in FIG. 35 is the picture processor according to the first to third embodiments of the present invention or the motion vector estimator included therein.

In FIG. 35, picture light incident through an optical system 602 forms a picture on a sensor 603. The sensor 603 is driven by a timing control circuit 609 to accumulate the picture light whose picture is formed and photo-electrically transfer the picture light to an electric signal. The electric signal read from the sensor 603 is converted to a digital signal by an analog/digital converter (ADC) 604, and then, the digital signal is inputted to the picture processor 605 including a motion picture processing part 100. In the picture processor 605, picture processes such as a Y/C process, an edge process, an enlarging and reducing process of a picture and a picture compressing and expanding process using the present invention are carried out. The above-described picture pre-processing part 134 is also included in the picture processor 605. The signal in which the picture is processed in the motion picture processing part 100 is recorded in or transferred to a media in a recording and transferring circuit 607. The recorded or transferred signal is reproduced by a reproducing circuit 608. The entire part of the picture pick-up system 601 is controlled by a system control circuit 610.

It is to be understood that the picture process in the motion picture processing part 100 according to the present invention and the motion vector estimator 130 included therein is not necessarily applied only to the signal based on the picture light whose picture is formed on the sensor 603 through the optical system 602, and the picture process may be applied to, for instance, a case that a picture signal inputted from an external device as an electric is processed.

The present invention can be continuously and repeatedly utilized in view of management in an industry for producing and selling devices having a motion picture shooting function such as a digital camera or a mobile phone with a camera, or an industry for forming or using picture contents, for instance, a movie industry or an information industry or the like.

What is claimed is:

1. A motion vector estimating method applying a sub-sampling method to a picture of an object frame and a picture of a reference frame in a motion picture compressing and encoding process, the method comprising:
   a step of sorting the picture of the object frame in accordance with the sub-sampling method to separate the picture of the object frame into first object picture data used for estimating a motion vector and second object picture data that is not used for estimating the motion vector, and packing the first and second object picture data separately;
   a step of sorting the picture of the reference frame in accordance with the sub-sampling method to separate the picture of the reference frame into first reference picture data used for estimating the motion vector and second reference picture data that is not used for estimating the motion vector, and packing the first and second reference picture data respectively;
   a step of storing the separated and packed first object picture data and second object picture data in an object data storing unit;
   a step of storing the separated and packed first reference picture data and second reference picture data in a reference data storing unit; and
   a step of reading the first object picture data stored in the object data storing unit and the first reference picture data stored in the reference data storing unit to estimate the motion vector,
   wherein said step of sorting and packing the picture of the object frame comprises sorting, for a unit of pixels of data read, the picture of the object frame arranged in a sequence according to an arrangement of pictures for each block so as to separate the picture of the object frame into the first object picture data and the second object picture data, and packing the first object picture data and the second object picture data separately; and
   said step of sorting and packing the picture of the reference frame comprises sorting, for a unit of pixels of data read, the picture of the reference frame arranged in a sequence according to an arrangement of pictures for each block so as to separate the picture of the reference frame into the first reference picture data and the second reference picture data, and packing the first reference picture data and the second reference picture data separately.

2. The motion vector estimating method according to claim 1, wherein the separated and packed object picture data and the separated and packed reference picture data are utilized as input picture data to a motion vector estimator.

3. The motion vector estimating method according to claim 1, wherein:
   for the picture of the object frame, the object picture data packed in a sequence according to the arrangement of the pictures for each block is utilized as input picture data to a motion vector estimator;
   for the picture of the reference frame, the reference picture data that is separated to the first reference picture data and the second reference picture data and packed is utilized as input picture data to the motion vector estimator; and
   for the picture of the object frame, the input picture data to the motion vector estimator is separated to first input picture data and second input picture data and the separated input picture data are packed again.

4. The motion vector estimating method according to claim 1, wherein:
   for the picture of the reference frame, the reference picture data packed in a sequence according to the arrangement of the pictures for each block is utilized as input picture data to a motion vector estimator;
   for the picture of the object frame, the object picture data that is separated to the first object picture data and the second object picture data and packed is utilized as input picture data to the motion vector estimator; and
   for the picture of the reference frame, the input picture data to the motion vector estimator is separated to first input picture data and second input picture data and the separated input picture data are packed again.

5. The motion vector estimating method according to claim 1, wherein the object data storing unit and the reference data storing unit each comprise a plurality of units for reading data in parallel so that picture data having the number of packs can be read together at an arbitrary position of the picture data packed.

6. The motion vector estimating method according to claim 1, further comprising a step of reading the first object picture data and the second object picture data stored in the object data storing unit and sorting the picture data read from the object data storing unit to restore input picture data.

7. The motion vector estimating method according to claim 1, further comprising a step of storing packed input picture data of the picture of the object frame in a second object data storing unit different from the object data storing unit without sorting the packed input picture data.

8. The motion vector estimating method according to claim 1, wherein the sub-sampling method selects pixels so as to have a checkered pattern in the picture of the object frame and the picture of the reference frame.

9. A motion picture processor having a motion vector estimator that applies a sub-sampling method to a picture of an object frame and a picture of a reference frame to estimate a motion vector and performs a motion picture compressing and encoding process, the motion picture processor comprising:
   an object data input and sorting unit for sorting the picture of the object frame in accordance with the sub-sampling method to separate object picture data into first object picture data used for estimating the motion vector and second object picture data that is not used for estimating the motion vector, and packing the first and second object picture data respectively;
   a reference data input and sorting unit for sorting the picture of the reference frame in accordance with the sub-sampling method to separate reference picture data into first reference picture data used for estimating the motion vector and second reference picture data that is not used for estimating the motion vector, and packing the first and second reference picture data respectively;

an object data storing unit for storing the packed first object picture data and second object picture data;

a reference data storing unit for storing the packed first reference picture data and second reference picture data; and a motion vector calculating unit for reading the first object picture data from the object data storing unit and reading the first reference picture data from the reference data storing unit to perform a calculation for estimating the motion vector, wherein:

the object data input and sorting unit sorts, for a unit of pixels of data read, the picture of the object frame arranged in a sequence according to an arrangement of the pictures for each block so as to separate the picture of the object frame into first object picture data and second object picture data, and packs the first object picture data and the second object picture data separately, and the reference data input and sorting unit sorts, for a unit of pixels of data read, the picture of the reference frame arranged in a sequence according to an arrangement of the pictures for each block so as to separate the picture of the reference frame into the first reference picture data and the second reference picture data, and packs the first reference picture data and the second reference picture data separately.

10. The motion picture processor according to claim 9, wherein the motion vector estimator comprises the object data storing unit, the reference data storing unit and the motion vector calculating unit.

11. The motion picture processor according to claim 10, wherein the motion vector estimator comprises the object data input and sorting unit and the reference data input and sorting unit.

12. The motion picture processor according to claim 10, wherein outputs of the object data input and sorting unit and the reference data input and sorting unit become input picture data to the motion vector estimator.

13. The motion picture processor according to claim 10, wherein data obtained by packing the object picture data in a sequence according to the arrangement of the pictures for each block and output of the reference data input and sorting unit become input picture data to the motion vector estimator; and wherein the object data input and sorting unit is included in the motion vector estimator.

14. The motion picture processor according to claim 10, wherein data obtained by packing the reference picture data in a sequence according to the arrangement of the pictures for each block and output of the object data input and sorting unit become input picture data to the motion vector estimator; and wherein the reference data input and sorting unit is included in the motion vector estimator.

15. The motion picture processor according to claim 9, wherein the object data storing unit and the reference data storing unit comprise a plurality of units for reading data in parallel so that picture data having the number of packs can be read together at an arbitrary position of the picture data packed.

16. The motion picture processor according to claim 9, wherein:

the object data storing unit and the reference data storing unit comprise a plurality of units, and any of the plurality of units of the object data storing unit and any of the plurality of units of the reference data storing unit that do not write or read data are controlled to stop the supply of an operating clock.

17. The motion picture processor according to claim 9, further comprising:

an object data output and sorting unit for reading and sorting the first object picture data and the second object picture data stored in the object data storing unit to restore input picture data of the object frame; and a reference data output and sorting unit for reading and sorting the first reference picture data and the second reference picture data stored in the reference data storing unit to restore the input picture data of the reference frame.

18. The motion picture processor according to claim 9, further comprising a second object data storing unit and a second reference data storing unit, which are different from the object data storing unit and the reference data storing unit, respectively, wherein packed input picture data of the picture of the object frame and the picture of the reference frame are stored in the second object data storing unit and the second reference data storing unit without performing a sorting process.

19. The motion picture processor according to claim 9, the sub-sampling method selects pixels so as to have a checkered pattern in the picture of the object frame and the picture of the reference frame.

* * * * *